US012795689B2

(12) United States Patent
Khoshnevisan et al.

(10) Patent No.: US 12,795,689 B2
(45) Date of Patent: Nov. 10, 2026

(54) GROUP-COMMON CONTROL INFORMATION FOR INDICATING USER EQUIPMENT-SPECIFIC PHYSICAL DOWNLINK CONTROL CHANNEL CANDIDATES

(71) Applicant: QUALCOMM Incorporated, San Diego, CA (US)

(72) Inventors: Mostafa Khoshnevisan, San Diego, CA (US); Gabi Sarkis, San Diego, CA (US); Le Liu, San Jose, CA (US); Huilin Xu, Temecula, CA (US)

(73) Assignee: Qualcomm Incorporated, San Diego, CA (US)

( * ) Notice: Subject to any disclaimer, the term of this patent is extended or adjusted under 35 U.S.C. 154(b) by 275 days.

(21) Appl. No.: 18/635,462

(22) Filed: Apr. 15, 2024

(65) Prior Publication Data

US 2025/0324435 A1 Oct. 16, 2025

(51) Int. Cl.
*H04W 72/232* (2023.01)
*H04W 72/12* (2023.01)

(52) U.S. Cl.
CPC ......... *H04W 72/232* (2023.01); *H04W 72/12* (2013.01)

(58) Field of Classification Search
None
See application file for complete search history.

(56) References Cited

U.S. PATENT DOCUMENTS

| | | | | |
|---|---|---|---|---|
| 2021/0360667 | A1* | 11/2021 | Moon | H04L 5/0035 |
| 2022/0078707 | A1* | 3/2022 | Zhou | H04W 52/0216 |
| 2023/0039536 | A1* | 2/2023 | Liu | H04L 5/0092 |
| 2023/0262599 | A1* | 8/2023 | Jung | H04L 5/0007 370/311 |
| 2024/0237016 | A1* | 7/2024 | Ma | H04L 5/0053 |

OTHER PUBLICATIONS

Partial International Search Report—PCT/US2025/020364—ISA/EPO—May 28, 2025.
International Search Report and Written Opinion—PCT/US2025/020364—ISA/EPO—Jul. 21, 2025.

* cited by examiner

*Primary Examiner* — Hong S Cho
(74) *Attorney, Agent, or Firm* — HARRITY & HARRITY, LLP / QUALCOMM

(57) ABSTRACT

Various aspects of the present disclosure generally relate to wireless communication. In some aspects, a user equipment (UE) may receive group-common control information comprising an indication of one or more physical downlink control channel (PDCCH) candidates for receiving UE-specific control information for the UE. The UE may receive the UE-specific control information in response to monitoring the one or more PDCCH candidates, the UE-specific control information comprising scheduling information for a shared channel communication. The UE may transmit or receive the shared channel communication according to the scheduling information. Numerous other aspects are described.

20 Claims, 13 Drawing Sheets

GROUP-COMMON CONTROL INFORMATION FOR INDICATING USER EQUIPMENT-SPECIFIC PHYSICAL DOWNLINK CONTROL CHANNEL CANDIDATES

FIELD OF THE DISCLOSURE

Aspects of the present disclosure generally relate to wireless communication and specifically relate to techniques, apparatuses, and methods for group-common control information for indicating user equipment-specific physical downlink control channel candidates.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

In some aspects, a method of wireless communication performed by a user equipment (UE) includes receiving group-common control information comprising an indication of one or more physical downlink control channel (PDCCH) candidates for receiving UE-specific control information for the UE; receiving the UE-specific control information in response to monitoring the one or more PDCCH candidates, the UE-specific control information comprising scheduling information for a shared channel communication; and transmitting or receiving the shared channel communication according to the scheduling information.

In some aspects, a method of wireless communication performed by a network node includes transmitting, to a set of UEs including at least a first UE, group-common control information comprising an indication of one or more PDCCH candidates for the first UE to receive UE-specific control information for the first UE; transmitting the UE-specific control information via the one or more PDCCH candidates in response to the group-common control information comprising the indication, the UE-specific control information comprising scheduling information for a shared channel communication; and transmitting or receiving the shared channel communication according to the scheduling information.

In some aspects, an apparatus for wireless communication at a UE includes one or more memories; and one or more processors, coupled to the one or more memories, configured to cause the UE to: receive group-common control information comprising an indication of one or more PDCCH candidates for receiving UE-specific control information for the UE; receive the UE-specific control information in response to monitoring the one or more PDCCH candidates, the UE-specific control information comprising scheduling information for a shared channel communication; and transmit or receive the shared channel communication according to the scheduling information.

In some aspects, an apparatus for wireless communication at a network node includes one or more memories; and one or more processors, coupled to the one or more memories, configured to cause the network node to: transmit, to a set of UEs including at least a first UE, group-common control information comprising an indication of one or more PDCCH candidates for the first UE to receive UE-specific control information for the first UE; transmit the UE-specific control information via the one or more PDCCH candidates in response to the group-common control information comprising the indication, the UE-specific control information comprising scheduling information for a shared channel communication; and transmit or receive the shared channel communication according to the scheduling information.

In some aspects, a non-transitory computer-readable medium storing a set of instructions for wireless communication includes one or more instructions that, when executed by one or more processors of a UE, cause the UE to: receive group-common control information comprising an indication of one or more PDCCH candidates for receiving UE-specific control information for the UE; receive the UE-specific control information in response to monitoring the one or more PDCCH candidates, the UE-specific control information comprising scheduling information for a shared channel communication; and transmit or receive the shared channel communication according to the scheduling information.

In some aspects, a non-transitory computer-readable medium storing a set of instructions for wireless communication includes one or more instructions that, when executed by one or more processors of a network node, cause the network node to: transmit, to a set of UEs including at least a first UE, group-common control information comprising an indication of one or more PDCCH candidates for the first UE to receive UE-specific control information for the first UE; transmit the UE-specific control information via the one or more PDCCH candidates in response to the group-common control information comprising the indication, the UE-specific control information comprising scheduling information for a shared channel communication; and transmit or receive the shared channel communication according to the scheduling information.

In some aspects, an apparatus for wireless communication includes means for receiving group-common control information comprising an indication of one or more PDCCH candidates for receiving UE-specific control information for the apparatus; means for receiving the UE-specific control information in response to monitoring the one or more PDCCH candidates, the UE-specific control information comprising scheduling information for a shared channel communication; and means for transmitting or receiving the shared channel communication according to the scheduling information.

In some aspects, an apparatus for wireless communication includes means for transmitting, to a set of UEs including at least a first UE, group-common control information comprising an indication of one or more PDCCH candidates for the first UE to receive UE-specific control information for the first UE; means for transmitting the UE-specific control information via the one or more PDCCH candidates in response to the group-common control information comprising the indication, the UE-specific control information comprising scheduling information for a shared channel communication; and means for transmitting or receiving the shared channel communication according to the scheduling information.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
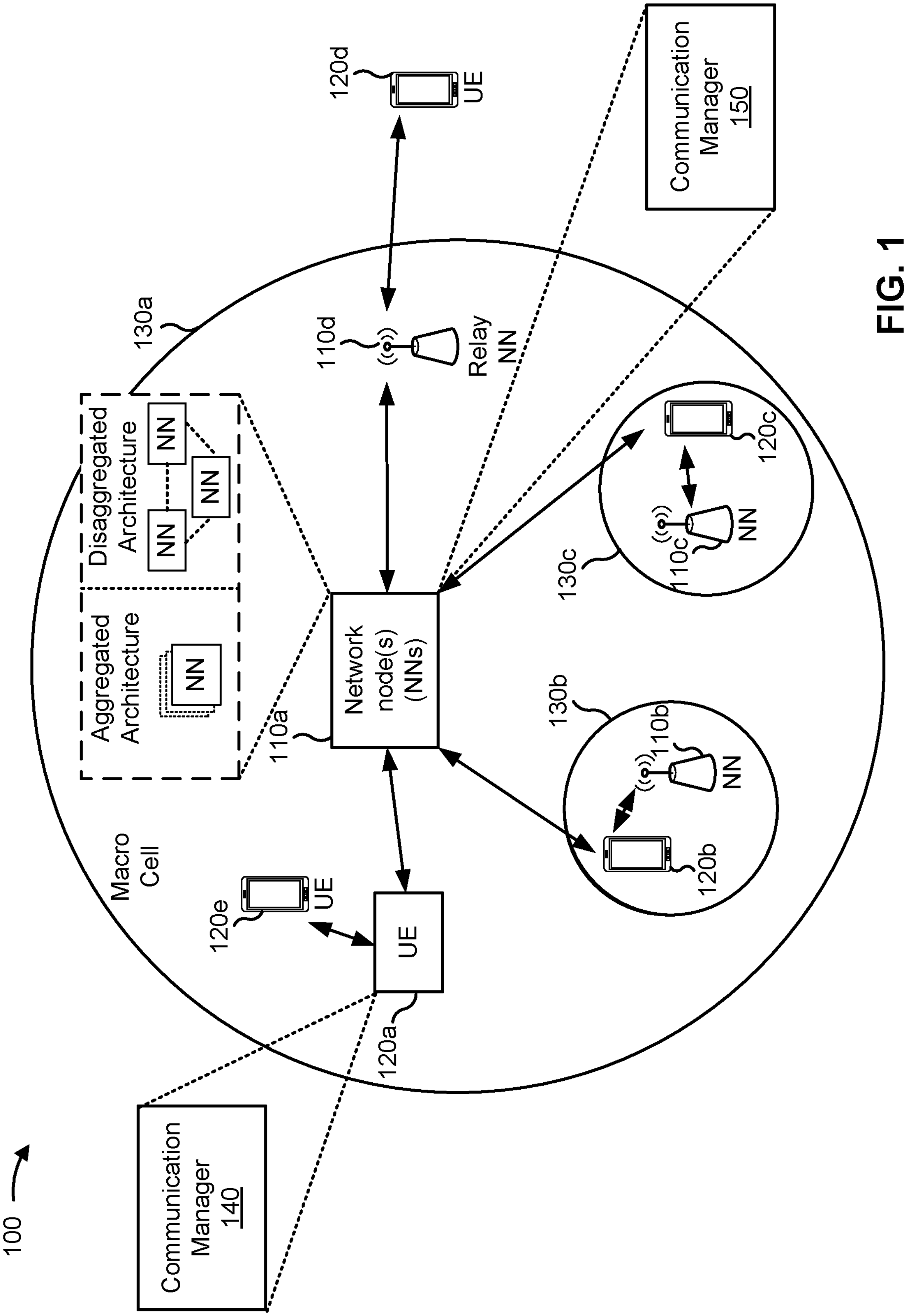
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A user equipment (UE) may be configured (e.g., by a network node) to monitor one or more physical downlink control channel (PDCCH) candidates for receiving control information. Each PDCCH candidate may span a set of resources (e.g., time resources and frequency resources) of the PDCCH. To attempt to receive the control information, the UE may perform a blind decoding operation on each of the configured PDCCH candidates to attempt to detect the control information. In cases where the network node is configuring multiple UEs to receive control information, the network node may configure each UE to monitor multiple PDCCH candidates, which may decrease a blocking probability between UEs (e.g., may decrease a likelihood that PDCCH candidates for different UEs overlap). But increasing the quantity of PDCCH candidates that are monitored by a UE may cause an increase in power consumption at the UE (e.g., as a result of the increased quantity of blind decoding operations performed by the UE).

In some wireless communication networks, to decrease the quantity of blind decoding operations performed by each UE while maintaining a relatively low probability of PDCCH blocking, a network node may rely on smaller control information payloads (e.g., smaller downlink control information (DCI) payloads). For example, the network node may configure the UE to monitor fewer PDCCH candidates to decrease the quantity of blind decoding operations performed by the UE, and each PDCCH candidate may be associated with a smaller control information payload (e.g., may correspond to a smaller DCI payload). In this example, the control information may include a first DCI (e.g., that is smaller) and a second DCI. Additionally, the first DCI may indicate a location (e.g., corresponding to a control channel element (CCE) location) of the second DCI, and the second DCI may include scheduling information for the UE. Here, the UE may monitor a smaller quantity of PDCCH candidates to detect the first DCI (e.g., the UE may monitor 10 PDCCH candidates rather than 20 PDCCH candidates), and the UE may monitor one additional PDCCH candidate to detect and decode the second DCI. In this example, the network node may consume more resources for transmitting PDCCHs (e.g., as compared to a wireless communication network where the network node transmits a single DCI to each of the multiple UEs), and each of the multiple UEs may still perform many blind decoding operations (e.g., to receive the first DCI). Additionally, a block probability associated with the first PDCCH may not improve relative to wireless communication networks where a single PDCCH is transmitted to each UE.

Various aspects herein relate generally to the network node transmitting control information to multiple UEs via first group-common control information (e.g., first group-common DCI) and second UE-specific control information (e.g., second UE-specific DCI). In some aspects, each UE in a group of UEs may monitor a single PDCCH candidate to receive the group-common control information, and the group-common control information may indicate, to one or more UEs in the group of UEs, locations (e.g., CCE locations) of one or more PDCCH candidates for the one or more UEs to receive the UE-specific control information. Here, each UE may perform fewer blind decoding operations than in wireless communication networks that do not utilize this combination of group-common and UE-specific control information. For example, each UE may perform two blind decoding operations (e.g., the first to receive the group-common control information and the second to receive the UE-specific control information) as opposed to ten or twenty blind decoding operations. Additionally, the network node may utilize one or more compression techniques to decrease a quantity of resources used to transmit the group-common control information.

Particular aspects of the subject matter described in this disclosure can be implemented to realize one or more of the following potential advantages. In some examples, by reducing a quantity of blind decoding operations performed by each UE, the described techniques can be used to decrease a power consumption at each UE associated with receiving control information. Additionally, by compressing at least a portion of the control information (e.g., in the group-common control information), the quantity of resources consumed by control information transmissions may be reduced, thus increasing the efficiency of the control information transmissions.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit DCI (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more PDCCHs, and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

In some wireless communication networks 100, a UE 120 (or another wireless communication device) may be configured with one or more control resource sets. In some cases, the one or more control resource sets may be associated with a BWP. For example, the UE 120 may be configured with three control resource sets (or some quantity of control resource sets less than three) for a BWP. In another example, the UE 120 may be configured with five control resource sets (or some quantity of control resource sets less than five) for the BWP. Each control resource set may include a first quantity of resources in a frequency domain (e.g., resource blocks) and a second quantity resources in a time domain (e.g., orthogonal frequency division multiplexing (OFDM) symbols). In some cases, a control resource set may include one, two, or three OFDM symbols. The control resource set may additionally be associated with CCE to resource element group (REG) (CCE-REG) bundle mapping type. The CCE-REG mapping type may correspond to a mapping method of CCEs to REGs associated with the control resource set. Additionally, or alternatively, the control resource set may be associated with a precoding granularity. For example, the control resource set may be associated with a wideband precoding granularity or an REG bundle granularity. The control resource set may also be associated with a transmission configuration indicator (TCI) state for receiving transmissions via a PDCCH that are associated with the coreset.

Additionally, the UE 120 may be configured with one or more search space sets. In some cases, the one or more search space sets may be associated with the BWP (e.g., the same BWP associated with the one or more control resource sets). For example, the UE 120 may be configured with up to ten search space sets for a BWP. A search space set may be associated with a control resource set (e.g., from the one or more control resource sets associated with the same BWP). Additionally, the search space set may be associated with one or more PDCCH monitoring occasions, which may correspond to a set of resources in a time and frequency domain. In some cases, the one or more PDCCH monitoring occasions may be defined by a first parameter indicating a periodicity and offset in units of slots (e.g., a monitoringSlotPeriodicityAndOffset parameter), a second parameter indicating a quantity of slots within a period corresponding to the search space set (e.g., a duration parameter), and/or a third parameter indicating a PDCCH monitoring pattern within a slot (e.g., a monitoringSymbolsWithinSlot parameter).

The search space set may also be associated with a type (e.g., a UE-specific search space set, a common search space set such as a group-common search space set). Additionally, or alternatively, the search space set may indicate one or more DCI formats for the UE 120 to monitor. Additionally, the search space set may indicate, to the UE 120, a quantity of PDCCH candidates for the UE 120 to monitor. In some cases, the quantity of PDCCH candidates that the UE 120 monitors corresponds to a quantity of candidates for each (e.g., of multiple) aggregation level.

In some cases, the UE 120 may monitor fewer than a threshold quantity of PDCCH candidates or fewer than a threshold quantity of CCEs associated with PDCCH monitoring in one slot. In some instances, the UE 120 monitoring fewer than the threshold quantity of PDCCH candidates may result in the UE performing fewer than the threshold quantity of blind decoding operations in the slot. In some cases, the threshold quantity of PDCCH candidates or CCEs may be on a per downlink serving cell basis. Here, the threshold quantity of PDCCH candidates or CCEs may be based on a limit for one component carrier, which may be fixed and/or may depend on a subcarrier spacing. An example of the threshold quantity of monitored PDCCH candidates per slot on the per serving cell basis is illustrated below by Table 1.

TABLE 1

| Maximum Number of Monitored PDCCH Candidates | |
|---|---|
| μ | Maximum number of monitored PDCCH candidates per slot and per serving cell $M_{PDCCH}^{max,slot,\mu}$ |
| 0 | 44 |
| 1 | 36 |
| 2 | 22 |
| 3 | 20 |

In the example of Table 1, the maximum number of monitored PDCCH candidates (e.g., the threshold quantity of monitored PDCCH candidates) may be per slot for a downlink BWP, and may be represented by $$M_{PDCCH}^{max,slot,\mu}.$$

Additionally the maximum number of monitored PDCCH candidates may be defined based on the subcarrier spacing configuration, which is represented by $\mu \in \{0, 1, 2, 3\}$ in the example of Table 1. An example of the threshold quantity of CCEs associated with PDCCH monitoring occasions in one slot is illustrated below by Table 2.

TABLE 2

| Maximum Number of Non-Overlapped CCEs | |
|---|---|
| μ | Maximum number of Non-Overlapped CCEs per Slot and per Serving cell $C_{PDCCH}^{max,slot,\mu}$ |
| 0 | 56 |
| 1 | 56 |
| 2 | 48 |
| 3 | 32 |

In the example of Table 2, the maximum number of non-overlapped CCEs (e.g., the threshold quantity of CCEs) may be per slot for a downlink BWP, and may be represented by $$C_{PDCCH}^{max,slot,\mu}.$$

Additionally, the maximum number of non-overlapped CCEs may be defined based on the subcarrier spacing configuration, which is represented by $\mu \in \{0, 1, 2, 3\}$ in the example of Table 2. In some instances (such as when there are more than four component carriers), a per-component carrier and total blind decoding or non-overlapping CCE limit may be based on Tables 1 and 2, a quantity of component carriers, a capability of the UE.

In some cases, a quantity of CCEs associated with a PDCCH candidate may be based on an aggregation level associated with the PDCCH candidate, and a quantity of CCEs in a control resource set associated with the PDCCH candidate. In some cases, the quantity of CCEs associated with the PDCCH candidate may be defined according to a formula (e.g., that is preconfigured by a network entity, that is defined in a wireless communication standard). For example, the quantity of CCEs associated with the PDCCH candidate may be defined using a hashing function that is a function of one or more parameters (e.g., of a radio network temporary identifier (RNTI) associated with the UE 120, an index of the control resource set, and/or a slot number associated with the PDCCH candidate) that randomizes the CCEs that are assigned to a UE 120 in a slot or control resource set and across different UEs 120. In some cases, randomizing the CCEs that are assigned across different UEs 120 may decrease a probability of blocking in instances where a wireless communication device (e.g., a network node 110) transmits different PDCCHs to different UEs 120. An example definition of the quantity of CCEs is shown below by Equation 1.

$$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\left\lfloor\frac{N_{CCE,p}}{L}\right\rfloor\right\}+i \tag{1}$$

In Equation 1, L corresponds to an aggregation level associated with the PDCCH candidate, $$Y_{p,n^{\mu}_{s,f}}=\left(A_p\cdot Y_{p,n^{\mu}_{s,f}-1}\right)\bmod D,\ Y_{p,-1}=n_{RNTI}\neq 0,\ A_p=39827$$

for pmod3=0, $A_p$=39829 for pmod3=1, $A_p$=39839 for pmod3=2, and D=65537.

In the example of the wireless communication network 100, the network node 110 may transmit control information to multiple UEs 120 via first group-common control information (e.g., first group-common DCI) and second UE-specific control information (e.g., second UE-specific DCI). In some aspects, each UE 120 in a group of UEs 120 may monitor a single PDCCH candidate to receive the group-common control information, and the group-common control information may indicate, to one or more UEs 120 in the group of UEs 120, locations (e.g., CCE locations) of one or more PDCCH candidates for the one or more UEs to receive the UE-specific control information. Here, each UE 120 may perform fewer blind decoding operations than in wireless communication networks that do not utilize this combination of group-common and UE-specific control information. For example, each UE 120 may perform two blind decoding operations (e.g., the first to receive the group-common control information and the second to receive the UE-specific control information) as opposed to ten or twenty blind decoding operations. Additionally, the network node 110 may utilize one or more compression techniques to decrease a quantity of resources used to transmit the group-common control information.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO).

Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may receive group-common control information comprising an indication of one or more PDCCH candidates for receiving UE-specific control information for the UE; receive the UE-specific control information in response to monitoring the one or more PDCCH candidates, the UE-specific control information comprising scheduling information for a shared channel communication; and transmit or receive the shared channel communication according to the scheduling information. Additionally, or alternatively, the communication manager 140 may perform one or more other operations described herein.

In some aspects, the network node 110 may include a communication manager 150. As described in more detail elsewhere herein, the communication manager 150 may transmit, to a set of UEs including at least a first UE, group-common control information comprising an indication of one or more PDCCH candidates for the first UE to receive UE-specific control information for the first UE; transmit the UE-specific control information via the one or more PDCCH candidates in response to the group-common control information comprising the indication, the UE-specific control information comprising scheduling information for a shared channel communication; and transmit or receive the shared channel communication according to the scheduling information. Additionally, or alternatively, the communication manager 150 may perform one or more other operations described herein.

As indicated above, FIG. 1 is provided as an example. Other examples may differ from what is described with regard to FIG. 1.

Figure 2:
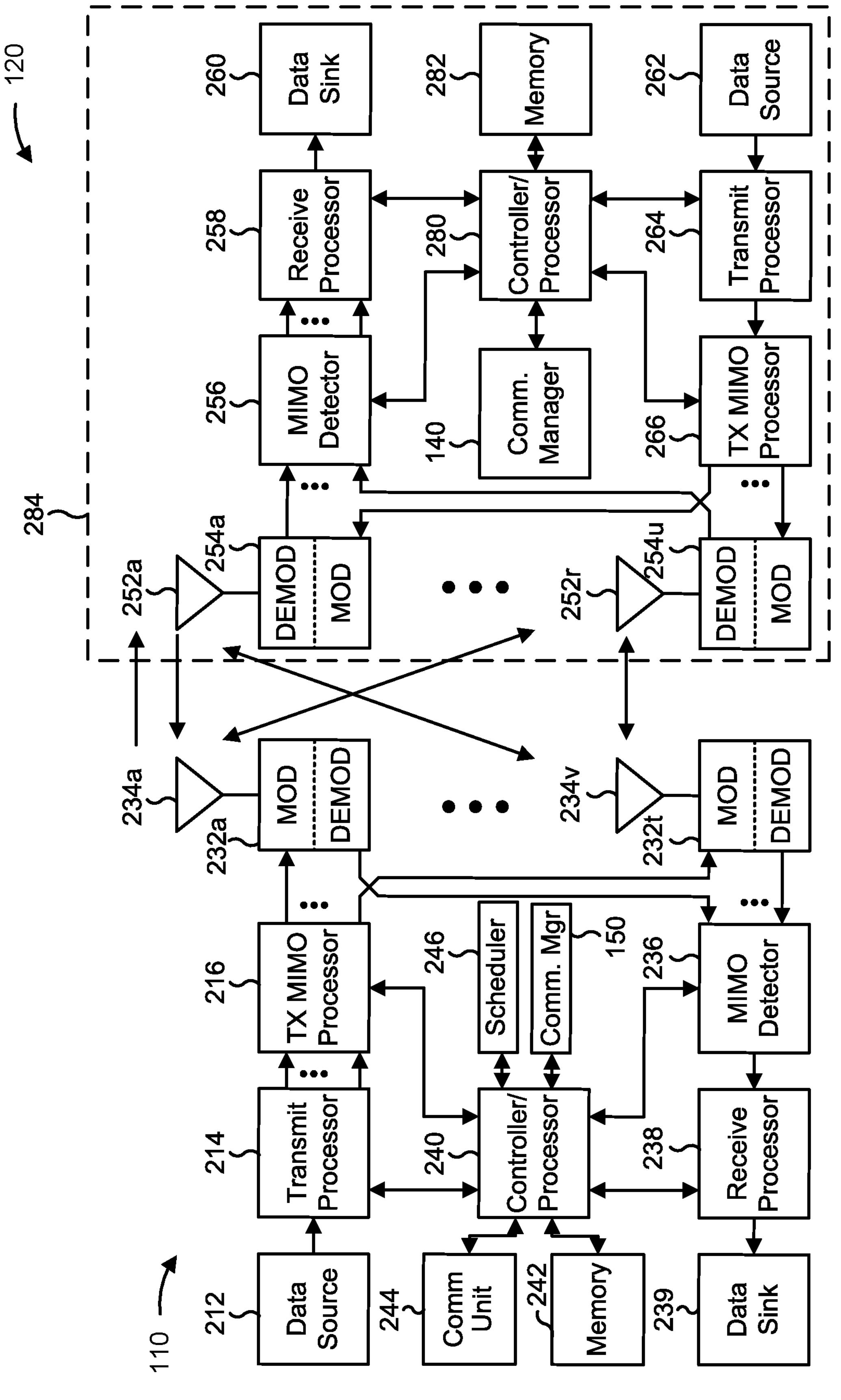
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for OFDM) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or cyclic prefix-OFDM (CP-OFDM)). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
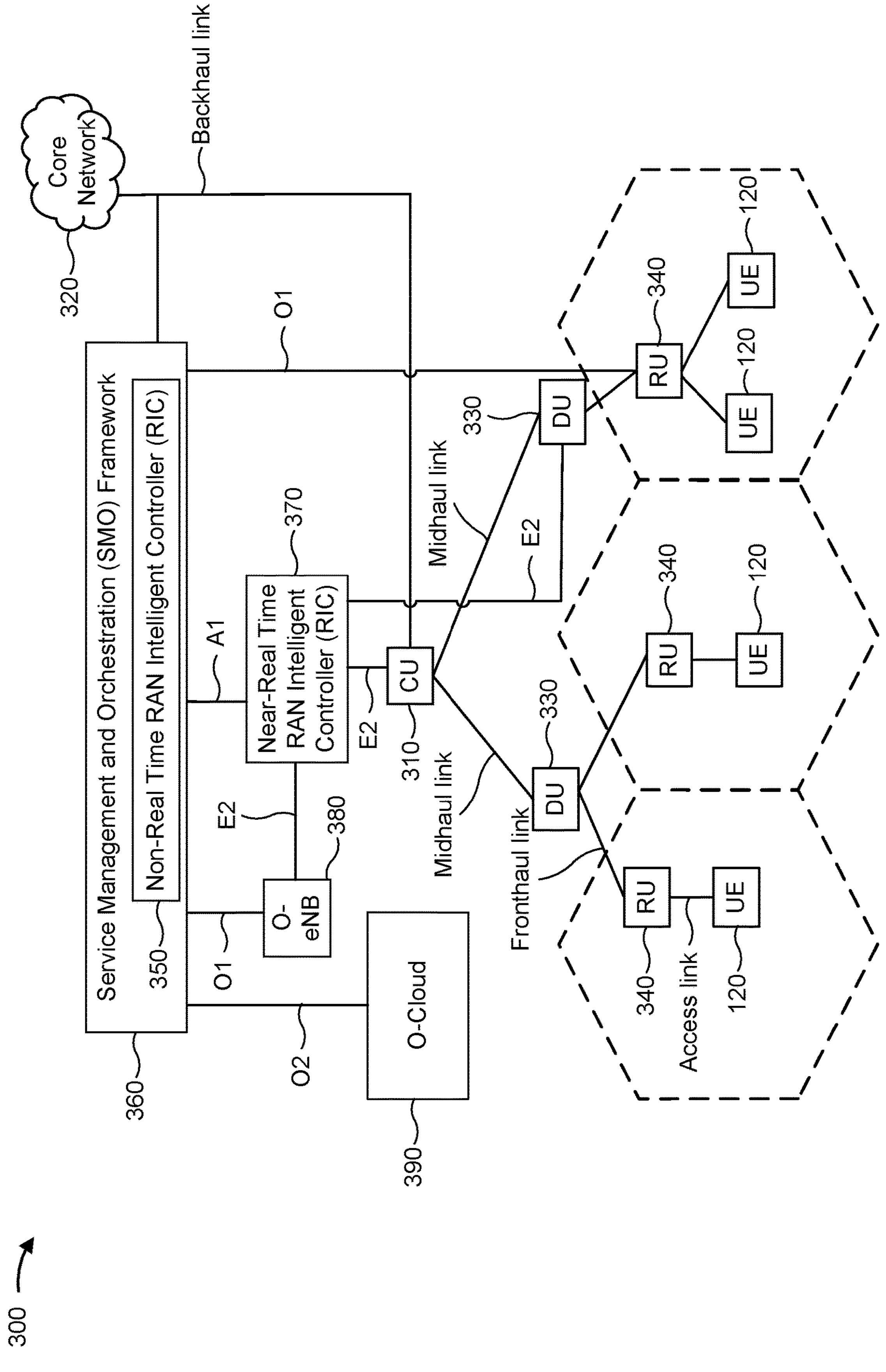
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with group-common control information for indicating UE-specific PDCCH candidates, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 1000 of FIG. 10, process 1100 of FIG. 11, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1000 of FIG. 10, process 1100 of FIG. 11, or other processes as described herein. In some examples, executing instructions may include running the instructions, converting the instructions, compiling the instructions, and/or interpreting the instructions, among other examples.

In some aspects, the UE (e.g., the UE 120) includes means for receiving group-common control information comprising an indication of one or more PDCCH candidates for receiving UE-specific control information for the UE; means for receiving the UE-specific control information in response to monitoring the one or more PDCCH candidates, the UE-specific control information comprising scheduling information for a shared channel communication; and/or means for transmitting or receiving the shared channel communication according to the scheduling information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node (e.g., the network node 110) includes means for transmitting, to a set of UEs including at least a first UE, group-common control information comprising an indication of one or more PDCCH candidates for the first UE to receive UE-specific control information for the first UE; means for transmitting the UE-specific control information via the one or more PDCCH candidates in response to the group-common control information comprising the indication, the UE-specific control information comprising scheduling information for a shared channel communication; and/or means for transmitting or receiving the shared channel communication according to the scheduling information. The means for the network node to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

As indicated above, FIG. 3 is provided as an example. Other examples may differ from what is described with regard to FIG. 3.

Figure 4:
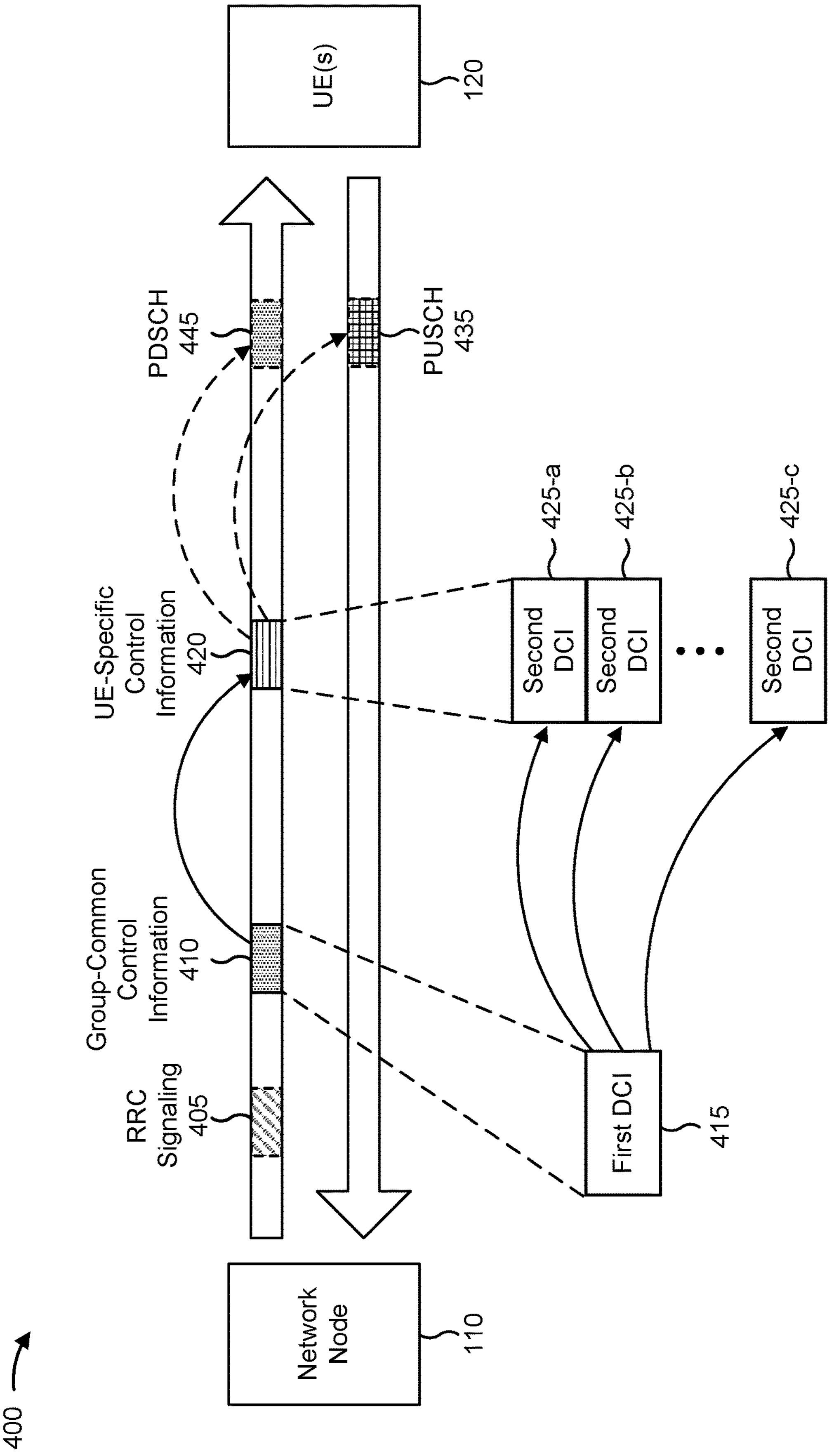
FIG. 4 is a diagram illustrating an example of a wireless communication network, in accordance with the present disclosure.

FIG. 4 is a diagram illustrating an example of a wireless communication network 400, in accordance with the present disclosure. As shown in FIG. 4, a network node 110 and a UE 120 may communicate with one another. While the wireless communication network 400 illustrates the network node 110 communicating with a single UE 120, the network node 110 may be communicating with multiple UEs 120 (e.g., not illustrated). In the wireless communication network 400, the network node 110 may transmit control information to a group of UEs 120 via first group-common control information 410 and a second set of UE-specific control information 420.

The network node 110 may transmit signaling indicating a group associated with the multiple UEs 120. For example, the network node 110 may transmit signaling (e.g., via RRC signaling 405) to each UE 120 in the group indicating a group RNTI (e.g., a same group RNTI, a group-common RNTI) associated with the group.

In some instances, the network node 110 may group UEs 120 into a same group based on a channel quality associated with communications between the network node 110 and the UEs 120. For example, the network node 110 may configure a group with UEs 120 having similar signal to interference plus noise (SINR) ratios. Additionally, or alternatively, the network node 110 may configure a group with UEs 120 having similar channel conditions (e.g., associated with channels between each UE 120 and the network node 110).

In cases where the network node 110 configures the group based on the channel qualities, the network node 110 may transmit group-common control information 410 to the UEs 120 in the group using one or more parameters that are selected based on the similar channel qualities. For example, the network node 110 may select an aggregation level for transmitting the group-common control information 410 based on a UE 120 having a lowest SINR in the group (e.g., to enable the UE 120 having the lowest SINR to decode the group-common control information 410). In another example, if the UEs 120 in the group have similar channel qualities, the network node 110 may select a single aggregation level for each UE-specific control information 420 (e.g., as opposed to selecting different aggregation levels for the UE-specific control information 420 for each UE 120 in the group). By using a single aggregation level for all of the UE-specific control information 420, the network node 110 may compress the group-common control information 410 by not including, for each UE 120 in the group, an indication of an aggregation level associated with a subsequent UE-specific control information 420.

In some other instances, the network node 110 may configure the group based on a beam direction associated with communications between the network node 110 and each UE 120 in the group. For example, the network node 110 may configure the group to include UEs 120 that are each associated with a similar or same beam direction. In these instances, the network node 110 may transmit the group-common control information 410 via a wider beam. For example, the network node 110 may select a beam (e.g., the wider beam) for transmitting the group-common control information 410 that enables each UE 120 in the group to decode the group-common control information 410. Additionally, the network node 110 may transmit the UE-specific control information 420 via one or more narrower beams. In some cases, transmitting the UE-specific control information 420 via the narrower beams (e.g., instead of a wider beam) may reduce resources used by the network node 110 for transmitting the UE-specific control information 420.

The network node 110 may transmit the group-common control information 410 to the UEs 120 in the group. The group-common control information 410 may include first DCI 415 and may be associated with the group-common RNTI. In some cases, the group-common control information 410 may indicate, to each UE 120 in the group, whether the UE 120 should monitor second DCI 425 (e.g., to receive any UE-specific control information 420). For example, the group-common control information 410 may indicate a subset of UEs 120 that are to monitor one or more subsequent PDCCH candidates to receive UE-specific control information 420. Additionally, or alternatively, the group-common control information 410 may indicate, to each UE 120 in the group, whether any of the second DCIs 425 that include control information specific to a single UE 120 include control information for that UE 120. In cases where the group-common control information 410 indicates one or more subsequent PDCCH monitoring occasions associated with UE-specific control information 420 (e.g., associated with control information that is specific to a first UE 120), the first UE 120 may monitor the one or more subsequent PDCCH monitoring occasions to attempt to receive the UE-specific control information 420 (e.g., via one or more of the second DCIs 425).

The group-common control information 410 may indicate resources (e.g., time resources, frequency resources, CCEs) for one or more UEs 120 to monitor for the second DCI 425 (e.g., to receive the UE-specific control information 420). Additionally, the group-common control information 410 may indicate one or more parameters associated with the UE-specific control information 420 (e.g., associated with the second DCI 425). For example, the group-common control information 410 may indicate parameters associated with resources for receiving the UE-specific control information 420. In some cases, the group-common control information 410 may indicate one or more CCEs associated with the UE-specific control information 420 and/or each second DCI 425, one or more aggregation levels associated with the UE-specific control information 420 and/or each second DCI 425, a control resource set associated with the UE-specific control information 420, a search space set associated with the UE-specific control information 420, a monitoring occasion (e.g., a PDCCH monitoring occasion) associated with the UE-specific control information 420 and/or each second DCI 425, or a slot associated with the UE-specific control information 420 and/or each second DCI 425.

The group-common control information 410 may indicate other parameters associated with the UE-specific control information 420. For example, the group-common control information 410 may indicate a DCI format associated with at least one PDCCH candidate for monitoring for the UE-specific control information 420 (e.g., to receive at least one of the second DCIs 425) or a payload size (e.g., a DCI payload size) associated with at least one PDCCH candidate for monitoring for the UE-specific control information 420 (e.g., to receive at least one of the second DCIs 425).

Based on the group-common control information 410, a subset of the UEs 120 in the group may each monitor one or more respective PDCCH candidates to receive UE-specific control information 420 (e.g., control information that is specific to each of the UEs 120 in the subset) via one or more of the second DCIs 425. The network node 110 may transmit the UE-specific control information 420 to one or more UEs 120 from the group. In the wireless communication network 400, the UE-specific control information 420 includes at least three second DCIs 425, where each second DCI 425 includes UE-specific control information 420 for one of the UEs 120 in the group. For example, the second DCI 425-*a* may include control information that is specific to a first UE 120 and includes scheduling information for a first communication to or from the first UE 120 (e.g., a PDSCH 445 or a PUSCH 435), the second DCI 425-*b* may include control information that is specific to a second UE 120 and includes scheduling information for a second communication to or from the second UE 120 (e.g., a PDSCH 445 or a PUSCH 435); and the second DCI 425-*c* may include control information that is specific to a third UE 120 and includes scheduling information for a third communication to or from the third UE 120 (e.g., a PDSCH 445 or a PUSCH 435).

In some cases, the UE-specific control information 420 (e.g., each second DCI 425 including the UE-specific control information 420) may be associated with a cell RNTI (C-RNTI) that is specific to one UE 120 (e.g., and is not shared between more than one UE 120 in the group). For example, a UE 120 may attempt to decode one of the second DCIs 425 to receive UE-specific control information 420 using a C-RNTI that is associated with that UE 120. For example, a first UE 120 may attempt to decode the second DCI 425-*a* using a C-RNTI associated with the first UE 120 to receive UE-specific control information 420 corresponding to the first UE 120.

In some cases, a UE 120 in the group may fail to detect, receive, or decode the group-common control information 410. Here, the UE 120 may perform a set of blind decoding operations on corresponding PDCCH candidates to attempt to detect, receive, and decode control information that is specific to that UE 120 (e.g., UE-specific control information 420) in one or more of the second DCIs 425. Here, the UE 120 may be unaware of the presence of or resources associated with the second DCIs 425 that are associated with the UE-specific control information 420. In some cases, the UE 120 may monitor a subset of the PDCCH candidates associated with the UE-specific control information 420 and/or the second DCIs 425 having an aggregation level that is larger than a threshold (e.g., having an aggregation level that is equal to or larger than 8, or equal to or larger than 16). Here, the UE 120 may monitor the PDCCH candidates based on a single DCI for scheduling (e.g., as opposed to being based on the first DCI 415 and the second DCI 425).

In another example where the UE 120 in the group fails to detect, receive, or decode the group-common control information 410, the UE 120 may not monitor any subsequent PDCCH candidates to attempt to detect, receive, or decode the second DCI 425. Instead, the UE 120 may wait until a next transmission of group-common control information 410 to attempt to detect, receive, or decode any DCI.

In some cases, the network node 110 may configure the UE 120 to either perform the set of blind decoding operations or refrain from monitoring the subsequent PDCCH candidates when the UE 120 fails to detect, receive, or decode the group-common control information 410. For example, the network node 110 may indicate, via the RRC signaling 405, whether the UE 120 is to perform the set of blind decoding operations or to refrain from monitoring the subsequent PDCCH candidates in response to the UE failing to detect, receive, or decode the group-common control information 410. In some cases, the network node 110 may configure a UE 120 to perform the set of blind decoding operations in cases where the UE 120 is associated with channel conditions that are less than a threshold (e.g., in cases where the UE 120 is associated with an SINR that is less than a threshold). Additionally, or alternatively, the network node 110 may configure the UE 120 to refrain from monitoring the subsequent PDCCH candidates in cases where the network node 110 did not transmit the group-common control information 410 (e.g., due to no UE 120 in the group being scheduled for any PDSCH 445 or PUSCH 435).

In some cases, the network node 110 may transmit the group-common control information 410 using a single PDCCH candidate having a first aggregation level. In these cases, to receive both the first DCI 415 and the second DCI 425, a UE 120 may monitor two PDCCH candidates. In some other cases, the network node 110 may transmit the group-common control information 410 using multiple PDCCH candidates (e.g., each having the same aggregation levels, having different aggregation levels). In these cases, to receive both the first DCI 415 and the second DCI 415, a UE 120 may monitor N+1 PDCCH candidates (e.g., where N corresponds to the quantity of PDCCH candidates associated with the group-common control information 410). In some instances, the aggregation level(s) and/or quantity of PDCCH candidates associated with the group-common control information 410 may be based on a configuration of a search space set associated with the group-common control information 410. The network node 110 may transmit signaling to the UEs 120 indicating the search space set configuration via the RRC signaling 405.

To receive the group-common control information 410 and the UE-specific control information 420, a UE 120 may monitor the same search space sets, monitoring occasions (e.g., PDCCH monitoring occasions), slots, and/or control resource sets, or the UE 120 may monitor different search space sets, monitoring occasions (e.g., PDCCH monitoring occasions), slots and/or control resource sets. In some cases where the UE-specific control information 420 is transmitted and received via different search space sets, monitoring occasions, slots, and/or control resource sets, the network node 110 may indicate the resources associated with the UE-specific control information 420 via the RRC signaling 405. For example, the network node 110 may transmit, and the UE 120 may receive, the RRC signaling 405 indicating one or more search space sets, monitoring occasions, slots, and/or control resource sets associated with the UE-specific control information 420 and/or the second DCI 425. Additionally, or alternatively, the RRC signaling 405 may indicate an association between the one or more search space sets, monitoring occasions, slots, and/or control resource sets associated with the group-common control information 410 and the UE-specific control information 420. Here, a UE 120 may identify the one or more search space sets, monitoring occasions, slots, and/or control resource sets associated with the UE-specific control information 420 based on the one or more search space sets, monitoring occasions, slots, and/or control resource sets associated with the group-common control information 410 and the association indicated by the RRC signaling 405.

In some other cases where the UE-specific control information is transmitted and received via different search space sets, monitoring occasions, slots, and/or control resource sets, the network node 110 may indicate the resources associated with the UE-specific control information 420 via the group-common control information 410 (e.g., via the first DCI 415 in the group-common control information 410).

The network node 110 may indicate, to each of the UEs 120, a DCI format associated with the second DCIs 425 of the UE-specific control information 420. In one example, the network node 110 may indicate the DCI format associated with the UE-specific control information 420 via the RRC signaling 405. For example, the network node 110 may transmit, and the UE 120 may receive, the RRC signaling 405 indicating the DCI format associated with the second DCIs 425 of the UE-specific control information 420. Additionally, or alternatively, the RRC signaling 405 may indicate an association between the DCI format associated with the group-common control information 410 and the UE-specific control information 420. Here, a UE 120 may identify the DCI format associated with the UE-specific control information 420 based on the DCI format associated with the group-common control information 410 and the association indicated by the RRC signaling 405. In some examples, if a UE 120 monitors four DCI formats for scheduling in the UE-specific control information 420 (e.g., DCI format 0_0 and DCI format 0_1 for PUSCH scheduling and DCI format 1_0 and DCI format 1_1 for PDSCH scheduling), the UE 120 may also monitor four corresponding first DCIs 415 (e.g., even in instances when there are not four first DCIs 415 in a slot or instance).

In some other cases, the network node 110 may indicate the DCI format associated with the UE-specific control information 420 via the group-common control information 410. For example, the first DCI 415 in the group-common control information 410 may indicate the DCI format for the second DCI(s) 425 included in the UE-specific control information 420. Additionally, or alternatively, the first DCI 415 may indicate a presence of and/or resources for multiple second DCIs 425 (e.g., associated with the same or different DCI formats) for each UE 120 in the group having UE-specific control information in the one or more subsequent PDCCH candidates. For example, the first DCI 415 may indicate one set of resources for DCI format 0_1 for a second DCI 425 to schedule a PUSCH 435 for a UE 120 and another set of resources for DCI format 1_1 for a second DCI 425 to schedule a PDSCH 445 for the UE 120. In some cases, a DCI payload size of the second DCIs 425 may be determined based on a DCI format associated with the second DCI 425. Additionally, a UE 120 may monitor a UE-specific search space set to detect the UE-specific control information 420 (e.g., to detect the one or more second DCIs 425 that include the control information specific to that UE 120).

As indicated above, FIG. 4 is provided as an example. Other examples may differ from what is described with respect to FIG. 4.

Figure 5:
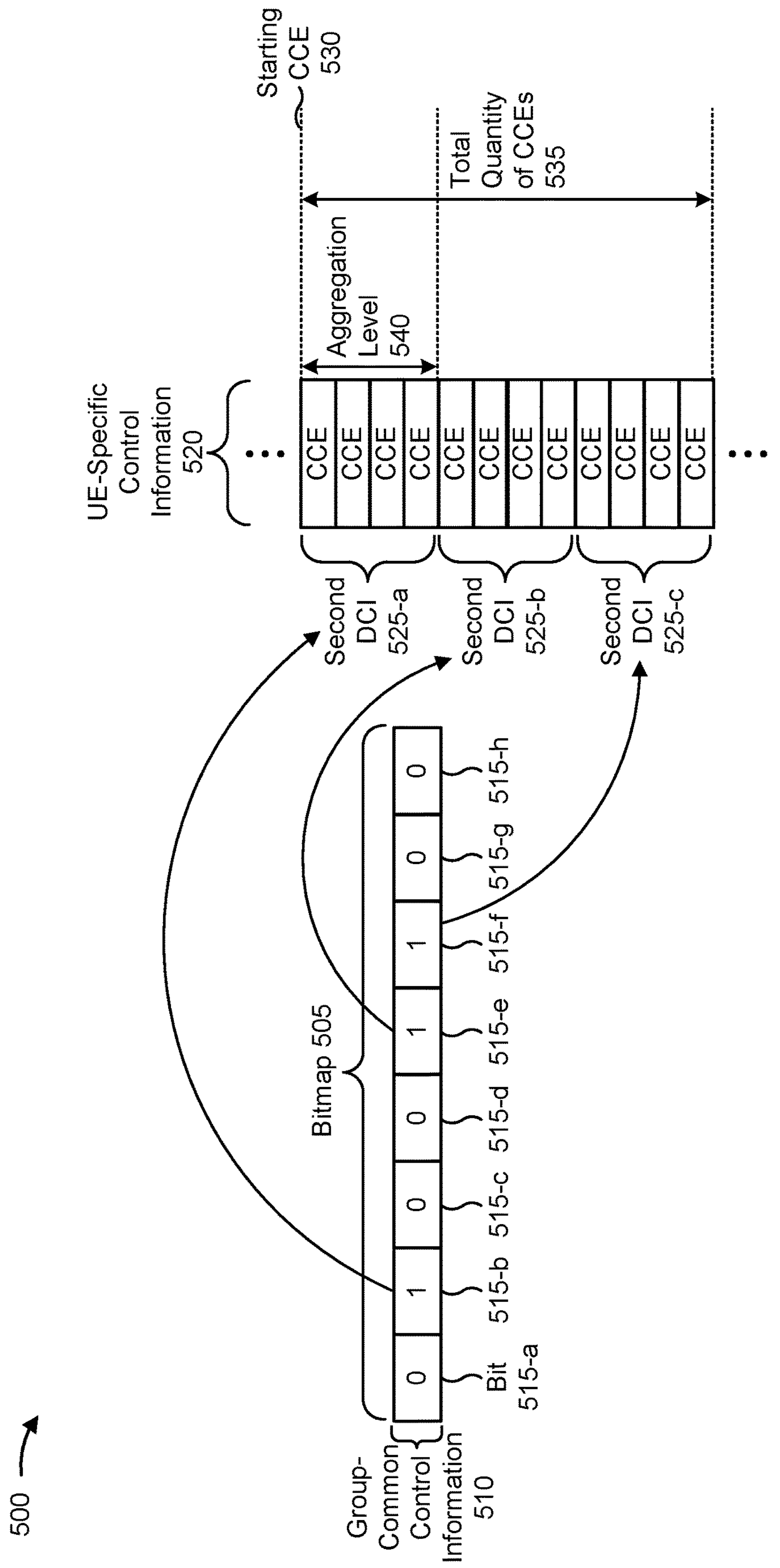
FIGS. 5-8 are diagrams illustrating examples of control information configurations, in accordance with the present disclosure.

FIG. 5 is a diagram illustrating an example 500 of a control information configuration, in accordance with the present disclosure. In some cases, the example 500 illustrates an example configuration of group-common control information 510 and UE-specific control information 520, which may be examples of the group-common control information 410 and the UE-specific control information 420 described with reference to FIG. 4.

In the example 500, a UE may determine whether to monitor one or more subsequent PDCCH candidates based on one or more bits 515 in the group-common control information 510. For example, the group-common control information 510 may include a field of bits 515 that may be interpreted (e.g., by each UE in the group) as a bitmap 505. In the example 500, the network node may indicate, to each UE in the group (e.g., via RRC signaling), a length of the bitmap 505 and a location in the bitmap 505 that is associated with that UE (e.g., a respective bit 515 in the bitmap 505 that is associated with each UE). For example, the network node may indicate, to each UE, that the bitmap 505 has a length of N, where N corresponds to a quantity of UEs in the group. In some cases, the network entity may configure an N that is larger than a quantity of UEs in the group. Here, UEs may move in and out of an RRC-connect state, but the network node may not have to update a configuration associated with the group-common control information 510 and the UE-specific control information 520 for all UEs in the group. In particular, the network node may refrain from updating the configuration for the group of UEs until more than a threshold quantity of UEs have changed.

Additionally, for each UE, the network node may indicate a position in the bitmap 505 (e.g., corresponding to one of the bits 515) that is associated with that UE, such that each UE is associated with a respective bit 515 having a position of $n_i$, where $1 \leq n_i \leq N$. In one example where there are eight UEs in the group, the network node 110 may configure a first UE to be associated with the bit 515-*a*, a second UE to be associated with the bit 515-*b*, a third UE to be associated with the bit 515-*c*, a fourth UE to be associated with the bit 515-*d*, a fifth UE to be associated with the bit 515-*e*, a sixth UE to be associated with the bit 515-*f*, a seventh UE to be associated with the bit 515-*g*, and an eighth UE to be associated with the bit 515-*h*.

A UE may receive and decode the group-common control information 510 to attempt to determine whether any subsequent PDCCH candidates (e.g., corresponding to one or more of the CCEs carrying the second DCIs 525) carry UE-specific control information 520 that is associated with that UE. In the example 500, the network node may set a bit 515 associated with a UE to a first value (e.g., '0') to indicate that the network node is not transmitting UE-specific control information associated with that UE via any subsequent PDCCH candidates. Additionally, the network node may set the bit 515 associated with the UE to a second value (e.g., '1') to indicate that the network node is transmitting UE-specific control information associated with that UE via one or more subsequent PDCCH candidates. Here, when a UE decodes the $n_i^{th}$ bit of the bitmap 505 (e.g., that is associated with that UE), if the $n_i^{th}$ bit has the first value, the UE may determine not to monitor any subsequent PDCCH candidates, and if the $n_i^{th}$ bit has the second value, the UE may determine to monitor one or more subsequent PDCCH candidates.

In the example 500, the network node 110 may indicate that the first UE (e.g., associated with the bit 515-*a*), the third UE (e.g., associated with the bit 515-*c*), the fourth UE (e.g., associated with the bit 515-*d*), the seventh UE (e.g., associated with the bit 515-*g*) and the eighth UE (e.g., associated with the bit 515-*h*) are not to monitor any subsequent PDCCH candidates for the UE-specific control information 520. Additionally, the network node 110 may indicate that the second UE (e.g., associated with the bit 515-*b*), the fifth UE (e.g., associated with the bit 515-*e*), and the sixth UE (e.g., associated with the bit 515-*f*) are to monitor one or more subsequent PDCCH candidates for UE-specific control information 520.

In the example 500, the second, fifth, and sixth UEs may monitor one or more subsequent PDCCH candidates to receive UE-specific control information 520. For example, the second UE may monitor the PDCCH candidate associated with the CCEs spanning the second DCI 525-*a* to receive UE-specific control information 520 associated with the second UE, the fifth UE may monitor the PDCCH candidate associated with the CCEs spanning the second DCI 525-*b* to receive UE-specific control information 520 associated with the fifth UE, and the sixth UE may monitor the PDCCH candidate associated with the CCEs spanning the second DCI 525-*c* to receive UE-specific control information 520 associated with the sixth UE.

In some other examples, the field in the group-common control information 510 that includes one or more bits indicative of whether each UE in the group is to monitor one or more subsequent PDCCH candidates (e.g., illustrated in the example 500 as the bitmap 505) may indicate up to a first quantity of UEs (e.g., K) to monitor one or more subsequent PDCCH candidates, where the first quantity of UEs is less than a total quantity of UEs in the group (e.g., N). In particular, $1 \leq K \leq N$. In some cases, the network node may indicate a value of K to the UEs via RRC signaling (e.g., the value of K may be RRC configured). In this example, the group-common control information 510 may not include the bitmap 505. Instead, the group-common control information 510 may include a field that is indicative of the bitmap 505. For example, the field may include fewer than N bits (e.g., the field may be further compressed as compared to the bitmap 505). In particular, the field may indicate one possibility from a set of $$\sum_{k=0}^{K} \binom{N}{k}$$

possibilities. Here, the field may include a quantity of bits that corresponds to $$\mathrm{ceil}\left(\log 2\left(\sum_{k=0}^{K} \binom{N}{k}\right)\right).$$

Upon receiving the group-control information 510, each UE may convert the field in the group-common control information to generate the bitmap 505, and may determine whether to monitor any subsequent PDCCH monitoring occasions based on the bitmap 505.

As an example, if N=20 (e.g., there are 20 UEs in the group), and K is 2 (e.g., the group-common control information 510 may indicate for up to two UEs to monitor subsequent PDCCH candidates), the group-common control information 510 may include a field having eight bits (e.g., instead of 20), as ceil $$\left(\log 2\left(\sum_{k=0}^{2} \binom{20}{k}\right)\right) = 8.$$

For example, the field may indicate '00010111' and each UE may convert that field to a bitmap having a length of 20 (e.g., '10100 00000 00000 00000'). In particular, each UE may first convert the field '00010111' to a decimal (e.g., 23). Then, each UE may identify an index of all possible combinations of $$\binom{N}{K}$$

(e.g., nchoosek(20,2)) based subtracting 1 (e.g., corresponding to nchoosek(20,0)) and 20 (e.g., corresponding to nchoosek(20,1)) from the decimal. In this example, each UE may identify an index of 2 (e.g., 23−1−20=2). Here, the second index may correspond to choosing {1,3} out of {1, 2, . . . , 20}, which may correspond to the 20-bit bitmap above. In this example, a UE associated with $n_i$=1 and $n_i$=3 (e.g., the first and third UEs) may determine to monitor one or more subsequent PDCCH candidates, while the remaining 18 UEs in the group may determine to refrain from monitoring any subsequent PDCCH candidates.

In some cases, compressing the bitmap 505 further may decrease a signaling overhead associated with the group-common control information 510. Additionally, because a likelihood that the network node schedules each UE in the group is relatively low, the network node only indicating up to a threshold quantity of UEs within the group (e.g., K) may not significantly impact the scheduling.

In the example 500, an aggregation level 540 associated with the UE-specific control information 520 may be common between each UE that receives UE-specific control information 520 (e.g., L=4). That is, each of the second DCIs 525 may have the same aggregation level 540 of 4.

The UE may identify the resources associated with the PDCCH candidates for receiving the UE-specific control information 520 based on a quantity of UEs in the group (e.g., N), a quantity of bits 515 in the bitmap 505 that occur prior to the $n_i^{th}$ bit of the bitmap 505, an aggregation level 540 or aggregation levels 540 associated with the UE-specific control information 520, a starting CCE 530 associated with the UE-specific control information, and/or a total quantity of CCEs 535 associated with the UE-specific control information 520.

In a first example, a UE may identify the resources associated with the PDCCH candidates for receiving the UE-specific control information 520 based on an aggregation level 540 (L) associated with the UE-specific control information 520 (e.g., that is common to each UE having UE-specific control information 520 in the subsequent PDCCH monitoring occasions), the starting CCE 530 (or an index associated with the starting CCE 530), such as $CCE_0$, and the quantity of bits 515 in the bitmap 505 having the second value (e.g., '1') prior to the $n_i^{th}$ bit (e.g., $M_0$ bits). For example, a UE may identify the resources (e.g., the CCEs) for receiving the second DCI 525 having the UE-specific control information 520 as having the CCE indices of $\{CCE_0+M_0L, CCE_0+M_0L+1, \ldots, CCE_0+M_0L+L-1\}$. For example, the fifth UE (e.g., associated with the bit 515-*e*) may identify that one bit 515 in the bitmap 505 has the second value (e.g., '1') prior to the bit 515-*e* (e.g., the bit 515-*b*). Accordingly, the fifth UE may rely on an $M_0$=1, and, in the example 500, an aggregation level L of 4. Thus, the fifth UE may identify the resources associated with the PDCCH candidates for receiving the UE-specific control information 520 that is associated with the fifth UE (e.g., the second DCI 525-*b*) as corresponding to the CCEs having indexes of $\{CCE_0+M_0L, CCE_0+M_0L+1, \ldots, CCE_0+M_0L+L-1\}=\{CCE_0+4, CCE_0+5, \ldots, CCE_0+7\}$, which may correspond to the second DCI 525-*b*.

In some cases, the aggregation level 540 and/or the starting CCE 530 may be RRC configured. For example, the network node may indicate, via RRC signaling and to each UE in the group, the aggregation level 540 and/or the starting CCE 530 as part of configurations related to monitoring the subsequent PDCCH candidates (e.g., for the UE-specific control information 520, for the second DCI 525) or as part of configurations related to interpreting the group-common control information 510.

In some other cases, the aggregation level 540 and/or the starting CCE 530 may be indicated by the group-common control information 510. For example, the group-common control information 510 may have one or more additional fields indicating the aggregation level 540 and/or the starting CCE 530 associated with the UE-specific control information 520. Here, the aggregation level 540 and/or the starting CCE fields in the group-common control information 510 may be common to each UE in the group.

In a second example, a UE may identify the resources associated with the PDCCH candidates for receiving the UE-specific control information 520 based on the starting CCE 530 (or an index associated with the starting CCE 530, such as $CCE_0$), a total quantity of CCEs 535 associated with the UE-specific control information 520 ($N_{CCE}$), the quantity of bits 515 in the bitmap 505 having the second value (e.g., '1') (M bits), and the quantity of bits 515 in the bitmap 505 having the second value (e.g., '1') prior to the $n_i^{th}$ bit (e.g., $M_0$ bits). For example, a UE may identify the resources (e.g., the CCEs) for receiving the second DCI 525 having the UE-specific control information 520 as having the CCE indices of $$\left\{CCE_0+M_0\frac{CCE_0}{M},\ CCE_0+M_0\frac{CCE_0}{M}+1,\ \ldots,\ CCE_0+M_0\frac{CCE_0}{M}+M_0\frac{CCE_0}{M}-1\right\}.$$

For example, the fifth UE (e.g., associated with the bit 515-*e*) may identify that there are three '1s' in the bitmap 505, and that there is one bit 515 in the bitmap 505 has the second value (e.g., '1') prior to the bit 515-*e* (e.g., the bit 515-*b*). Accordingly, the fifth UE may rely on an M=3, $M_0$=1, and in the example 500, an aggregation level 540 L of 4 and a total quantity of CCEs 535 associated with the UE-specific control information 520 ($N_{CCE}$) of 12. Thus, the fifth UE may identify the resources associated with the PDCCH candidates for receiving the UE-specific control information 520 that is associated with the fifth UE (e.g., the second DCI 525-*b*) as corresponding to the CCEs having indexes of $$\left\{CCE_0+M_0\frac{CCE_0}{M},\ CCE_0+M_0\frac{CCE_0}{M}+1,\ \ldots,\ CCE_0+M_0\frac{CCE_0}{M}+M_0\frac{CCE_0}{M}-1\right\}=\{CCE_0+4,\ CCE_0+5,\ \ldots,\ CCE_0+7\},$$

which may correspond to the second DCI 525-*b*.

In this second example, the aggregation level 540 may correspond to $$\frac{CCE_0}{M}$$

and may be based on a quantity of UEs that are scheduled to monitor the subsequent PDCCH candidates. In instances where $$\frac{CCE_0}{M}$$

is not an integer, a floor or ceiling operation may be performed (or the ULs and network node may round $$\frac{CCE_0}{M}$$

up or down to a closest aggregation level).

In some cases, the starting CCE 530 and/or the total quantity of CCEs 535 associated with the UE-specific control information 520 may be RRC configured. For example, the network node may indicate, via RRC signaling and to each UE in the group, the starting CCE 530 and/or the total quantity of CCEs 535 as part of configurations related to monitoring the subsequent PDCCH candidates (e.g., for the UE-specific control information 520, for the second DCI 525) or as part of configurations related to interpreting the group-common control information 510.

In some other cases, the starting CCE 530 and/or the total quantity of CCEs 535 may be indicated by the group-common control information 510. For example, the group-common control information 510 may have one or more additional fields indicating the starting CCE 530 and/or the total quantity of CCEs 535 associated with the UE-specific control information 520. Here, the starting CCE 530 and/or the total quantity of CCEs 535 fields in the group-common control information 510 may be common to each UE in the group.

As indicated above, FIG. 5 is provided as an example. Other examples may differ from what is described with respect to FIG. 5.

Figure 6:
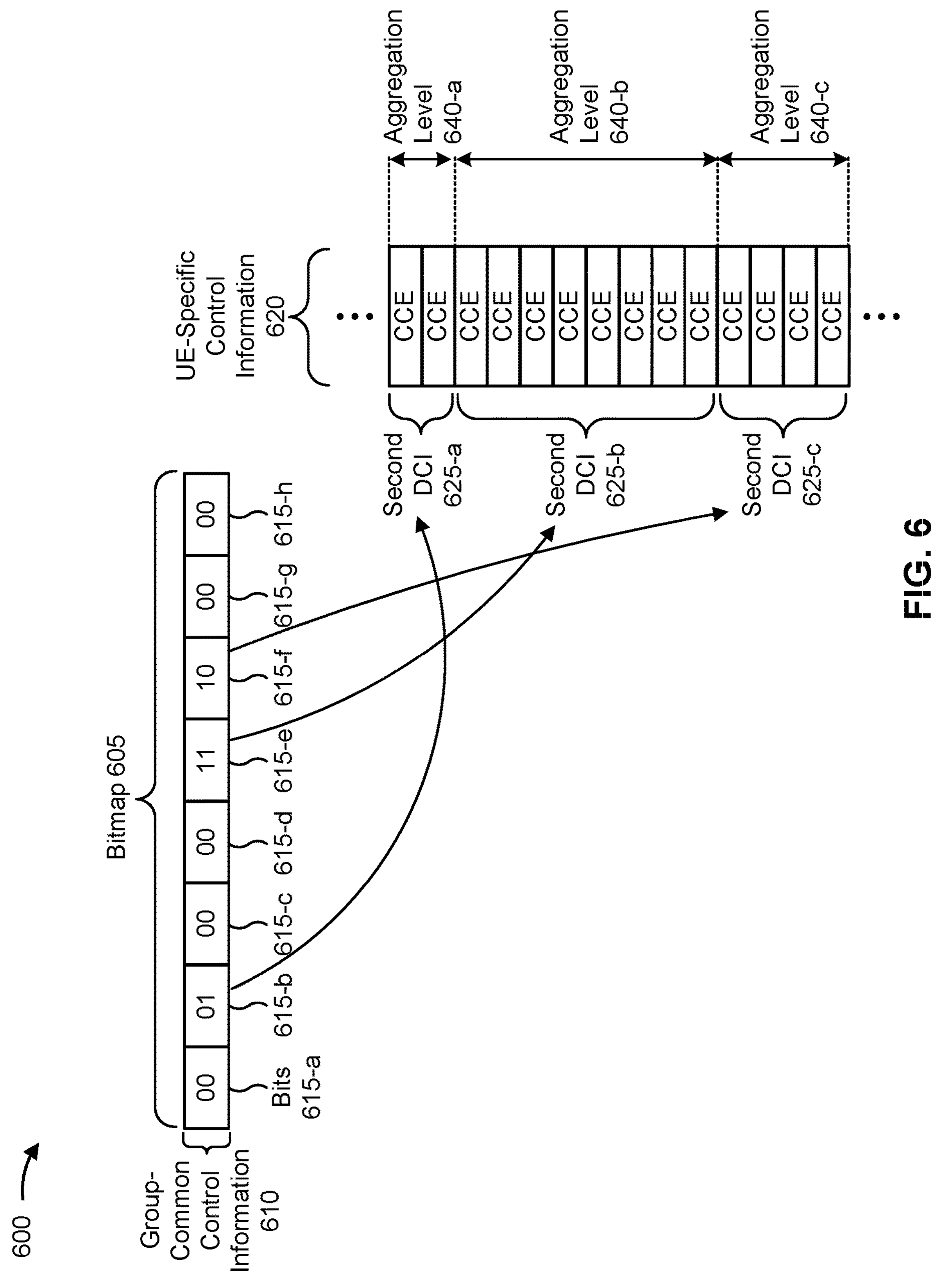

FIG. 6 is a diagram illustrating an example 600 of a control information configuration, in accordance with the present disclosure. In some cases, the example 600 illustrates example an example configuration of group-common control information 610 and UE-specific control information 620, which may be examples of the group-common control information 410 and 510 and the UE-specific control information 420 and 520 described with reference to FIGS. 4 and 5.

A UE may receive and decode the group-common control information 610 to attempt to determine whether any subsequent PDCCH candidates (e.g., corresponding to one or more of the CCEs carrying the second DCIs 625) carry UE-specific control information 620 that is associated with that UE. In the example 600, the network node may set one or more bits 615 associated with a UE to a first value (e.g., '00') to indicate that the network node is not transmitting UE-specific control information associated with that UE via any subsequent PDCCH candidates. Additionally, the network node may set the one or more bits 615 associated with the UE to a different value (e.g., '01', '10,' or '11') to indicate that the network node is transmitting UE-specific control information associated with that UE via one or more subsequent PDCCH candidates. Here, when a UE decodes the $n_i^{th}$ bits of the bitmap 605 (e.g., that is associated with that UE), if the $n_i^{th}$ bits have the first value, the UE may determine not to monitor any subsequent PDCCH candidates and if the $n_i^{th}$ bits have another value, the UE may determine to monitor one or more subsequent PDCCH candidates.

In the example 600, the network node 110 may indicate that the first UE (e.g., associated with the bits 615-*a*), the third UE (e.g., associated with the bits 615-*c*), the fourth UE (e.g., associated with the bits 615-*d*), the seventh UE (e.g., associated with the bits 615-*g*) and the eighth UE (e.g., associated with the bits 615-*h*) are not to monitor any subsequent PDCCH candidates for the UE-specific control information 620. Additionally, the network node 110 may indicate that the second UE (e.g., associated with the bits 615-*b*), the fifth UE (e.g., associated with the bits 615-*e*), and the sixth UE (e.g., associated with the bits 615-*f*) are to monitor one or more subsequent PDCCH candidates for UE-specific control information 620.

Similar to the example 500, in the example 600, the group-common control information 610 may include a field of bits 615 that is interpreted (e.g., by each UE in the group) as a bitmap 605. However, while example 500 illustrates an aggregation level 540 that is common between each UE that receives UE-specific control information 520 (e.g., L=4), example 600 illustrates aggregation levels 640 that are specific to each UE (e.g., that are UE-specific aggregation levels 640). Here, the network node may indicate the UE-specific aggregation levels 640 for each UE that is to monitor subsequent PDCCH monitoring occasions via one or more fields in the group-common control information 610. For example, the group-common control information 610 may indicate an aggregation level 640-*a* of two for the second UE, an aggregation level 640-*b* of eight for the fifth UE, and an aggregation level 640-*c* of four for the sixth UE.

In one example, the network node may indicate the UE-specific aggregation levels 640 using multiple bits 615 in the bitmap 605 (e.g., as illustrated in example 600). For example, rather than each bit 615 in the bitmap 605 indicating for a UE to either monitor or not monitor subsequent PDCCH candidates, a first value for the bits 615 in the bitmap may indicate for the UEs to not monitor any subsequent PDCCH candidates, and remaining values for the bits 615 in the bitmap (e.g., the three remaining values in the example 600, but may include more remaining values if each UE is associated with more than two bits 615) may indicate for the UE to monitor one or more subsequent PDCCH candidates and may indicate the UE-specific aggregation level 640. For example, a second value of '01' may indicate the aggregation level 640-*a* of 2, a third value of '10' may indicate the aggregation level 640-*c* of 4, and a fourth value of '11' may indicate the aggregation level 640-*b* of 8. The network node may indicate a configuration for the multiple bits 615 (e.g., and a mapping between the values of the multiple bits 615 and respective aggregation levels 640) via RRC signaling.

In another example (e.g., not illustrated by the group-common control information 610 shown in FIG. 6), the group-common control information 610 may include one or more additional UE-specific fields to indicate the UE-specific aggregation levels 640. For example, each UE-specific field may include two bits per UE, and may indicate one out of four possible choices for an aggregation level 640 that is specific to that UE.

In some cases, the starting CCE (e.g., the initial CCE) may be common to each UE that is to monitor subsequent PDCCH monitoring occasions, and may be RRC configured or configured via a field in the group-common control information 610 (e.g., as described with reference to FIG. 5). Each UE that is configured to monitor one or more subsequent PDCCH candidates may be configured to identify the resources associated with the one or more subsequent PDCCH candidates as described above with reference to FIG. 5. Additionally, each UE may add the aggregation levels 640 for each previously-scheduled UE in the bitmap 605 to find a starting CCE for its own PDCCH candidate.

In the example 600, the second, fifth, and sixth UEs may monitor one or more subsequent PDCCH candidates to receive UE-specific control information 620. For example, the second UE may monitor the PDCCH candidate associated with the CCEs spanning the second DCI 625-*a* to receive UE-specific control information 620 associated with the second UE, the fifth UE may monitor the PDCCH candidate associated with the CCEs spanning the second DCI 625-*b* to receive UE-specific control information 620 associated with the fifth UE, and the sixth UE may monitor the PDCCH candidate associated with the CCEs spanning the second DCI 625-*c* to receive UE-specific control information 620 associated with the sixth UE.

As indicated above, FIG. 6 is provided as an example. Other examples may differ from what is described with respect to FIG. 6.

Figure 7:
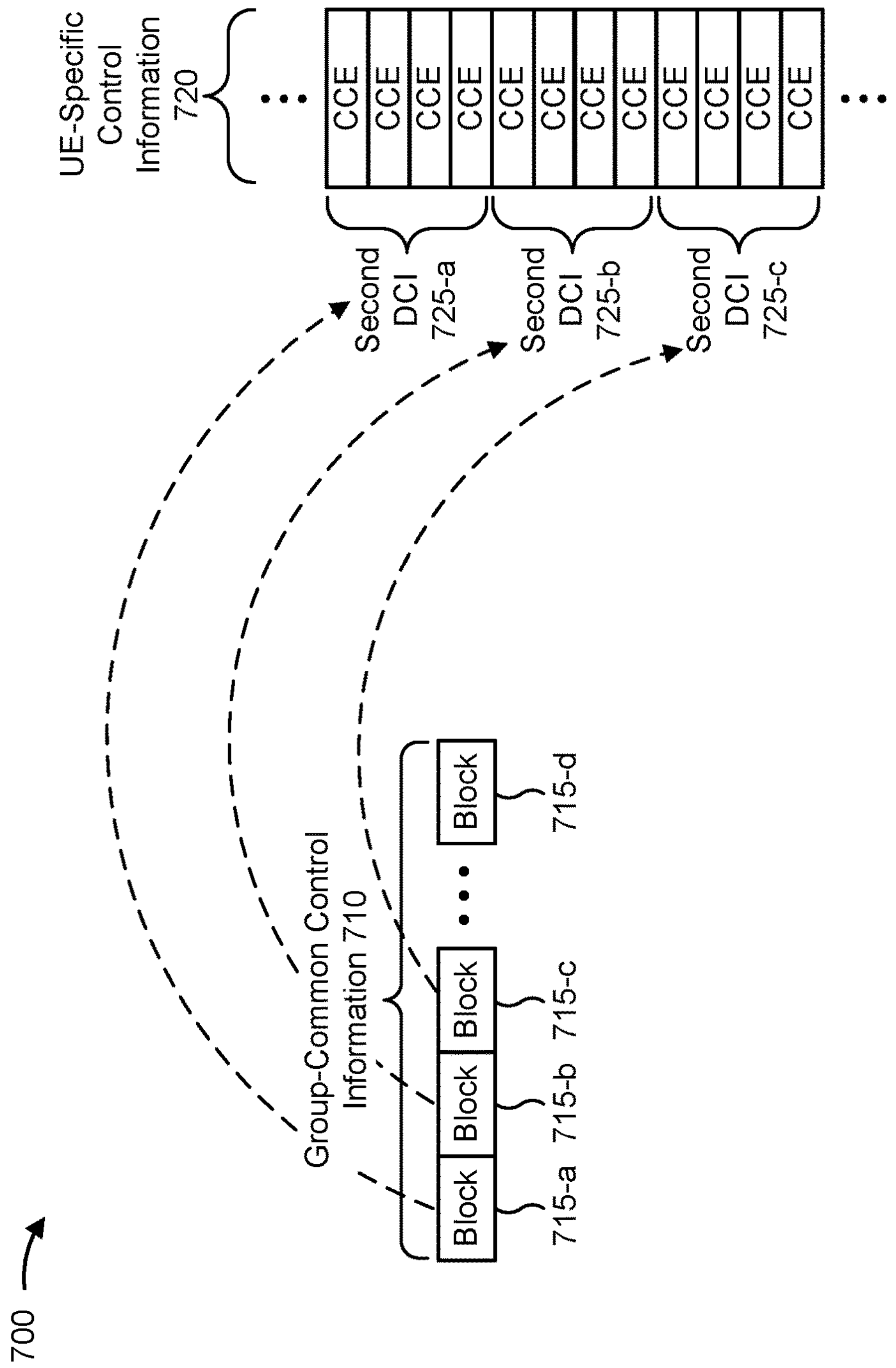

FIG. 7 is a diagram illustrating an example 700 of a control information configuration, in accordance with the present disclosure. In some cases, the example 700 illustrates example an example configuration of group-common control information 710 and UE-specific control information 720, which may be examples of the group-common control information 410 and the UE-specific control information 420 described with reference to FIG. 4.

A UE may receive and decode the group-common control information 710 to attempt to determine whether any subsequent PDCCH candidates (e.g., corresponding to one or more of the CCEs carrying the second DCIs 725) carry UE-specific control information 720 that is associated with that UE. In the example 700, the group-common control information 710 may include a set of blocks 715 that each include one or more fields (e.g., corresponding to a subset of the fields in the group-common control information 710) carrying control information. Each UE in the group may be configured to monitor one or more of the blocks 715 to determine whether to monitor any subsequent PDCCH candidates and, in instances that a UE determines to monitor one or more subsequent PDCCH candidates to receive UE-specific control information 720, to identify the resources associated with the one or more subsequent PDCCH candidates.

In a first example, each block 715 may include control information that is associated with one or more of the UEs in the group. For example, the block 715-*a* may include a subset of fields carrying control information associated with a first UE, the block 715-*b* may include a subset of fields carrying control information associated with a second UE, the block 715-*c* may include a subset of fields carrying control information associated with a third UE, and the block 715-*d* may include a subset of fields carrying control information associated with a fourth UE. In this example, the group-common control information 710 may include a respective block 715 that is associated with each UE in the group.

In the first example where each block 715 includes control information that is associated with one of the UEs in the group, each UE may be configured (e.g., via RRC signaling) to monitor one block 715 in the group-common control information 710. For example, the network node may transmit RRC signaling indicating a starting location of a block 715 that the UE is configured to monitor. Based on the configuration indicated by the network node, each UE may decode the group-common control information 710 (e.g., using the group-common RNTI) and detect the control information that is associated with each respective UE within one of the blocks 715. Additionally, each block 715 may indicate the resources (e.g., the time resources, the frequency resources, the CCEs) associated with the subsequent PDCCH candidates. For example, each block 715 may include one or more fields that indicate whether a UE should monitor any subsequent PDCCH candidates (e.g., via one codepoint of the block 715, via one bit of the block 715), a starting CCE associated with the UE-specific control information 720 associated with that UE, an aggregation level associated with the UE-specific control information 720 for that UE, or a combination thereof. For example, the second block 715-*b* may indicate, to the second UE, that the second UE is to monitor the set of CCEs associated with the second DCI 725-*b* to receive the UE-specific control information 720 for the second UE. Additionally, the second block 715-*b* may indicate that the UE-specific control information 720 for the second UE (e.g., the second DCI 725-*b*) may have an aggregation level of 4.

In some cases, group-common control information 710 having the subsets of fields (e.g., each associated with one of the blocks 715) that are associated with one of the UEs in the group may increase a flexibility for indicating information related to the second DCIs 725 (e.g., as compared to group-common control information 710 that includes a bitmap, as described with reference to FIGS. 5 and 6). Additionally, or alternatively, a signaling overhead associated with group-common control information 710 that has the subsets of fields may be greater than group-common control information 710 that includes a bitmap. Further, the signaling overhead associated with group-common control information 710 that has the subsets of fields may be less than cases where the network node transmits UE-specific control information to each UE in the group (e.g., due to a decrease in a cyclic redundancy check (CRC) overhead).

In a second example, each block 715 may include control information that is associated with a location (e.g., with one or more time and/or frequency resources) for the second DCI 725. For example, the block 715-*a* may include control information that is associated with a location (e.g., with a set of CCEs) corresponding to the second DCI 725-*a*, the block 715-*b* may include control information that is associated with a location (e.g., with a set of CCEs) corresponding to the second DCI 725-*b*, and the block 715-*c* may include control information that is associated with a location (e.g., with a set of CCEs) corresponding to the second DCI 725-*c*. In some cases, each block 715 may be configured with an associated starting CCE and/or aggregation level. The starting CCE may be unique for each block 715 (and/or may be configured for each block index) and the aggregation level may be either shared between each block 715 or may be configured on a per-block basis.

Each block 715 may indicate one or more UEs that may have UE-specific control information 720 in the location associated with the block 715. In some cases, a block 715 may indicate whether a UE is to monitor a PDCCH candidate associated with the location associated with the block 715 by including an identifier associated with that UE. For example, the block 715 may include a configurable identifier associated with a UE, a subset of an existing identifier associated with a UE (e.g., a subset of an RNTI such as a C-RNTI, a quantity of least significant bits of the RNTI, a quantity of most significant bits of the RNTI). A block 715 may additionally include an explicit bit or special field that indicates cases when the block 715 does not indicate any UEs (e.g., that the block 715 indicates that no UE in the group is to monitor the associated PDCCH candidate)

In one example, the block 715-*a* may indicate that a first UE may have UE-specific control information 720 in the set of CCEs associated with the second DCI 725-*a* (e.g., by including an identifier or a portion of an identifier associated with the first UE), the block 715-*b* may indicate that a second UE and a third UE may have UE-specific control information 720 in the set of CCEs associated with the second DCI 725-*b* (e.g., by including identifiers or portions of identifiers associated with the second and third UEs), and the block 715-*c* may indicate that the first UE and the second UE may have UE-specific control information 720 in the set of CCEs associated with the second DCI 725-*c* (e.g., by including identifiers or portions of identifiers associated with the first and third UEs). Here, the first UE may monitor the PDCCH candidates associated with second DCIs 725-*a* and DCI 725-*c* to attempt to receive UE-specific control information 720 associated with the first UE, the second UE may monitor the PDCCH candidates associated with second DCIs 725-*b* and 725-*c* to attempt to receive UE-specific control information 720 associated with the second UE, and the third UE may monitor the PDCCH candidate associated with second DCI 725-*b* to attempt to receive UE-specific control information 720 associated with the third UE.

In the second example where each block 715 includes control information that is associated with the location, an association between each block 715 and the location may be fixed (e.g., based on an index of the block 715) or configurable (e.g., via RRC signaling). Additionally, a quantity of blocks 715 in the group-common control information 710 (which may correspond to a quantity of subsequent PDCCH candidates carrying UE-specific control information 720) and/or a quantity of candidates for the group-common control information 710 may be fixed or configured (e.g., by RRC signaling). In some cases, each block 715 may be associated with a PDCCH candidate that is associated with a same aggregation level, or may be associated with an aggregation level that is specific to each block 715. For example, the network node may configure (e.g., via RRC signaling, via one or more fields in the group-common control information 710) an aggregation level that is either associated with each of the blocks 715, or that is block-specific.

In some instances, the blocks 715 may not include enough bits of the identifiers associated with each UE to uniquely identify a UE (e.g., due a size limitation associated with the block 715). Accordingly, a first portion of the UE identifier may be included in the block 715, and a second portion of the UE identifier (e.g., to uniquely identify the UE) may be indicated by the corresponding second DCI 725. In some cases, the second DCI 725 may explicitly indicate the second portion of the UE identifier (e.g., the second DCI 725 may include a field indicating the second portion of the UE identifier). In some other cases, the second DCI 725 may implicitly indicate the second portion of the UE identifier. For example, a CRC in the second DCI may be masked based on the second portion of the UE identifier, the second DCI may be scrambled based on the second portion of the UE identifier, or a DMRS sequence in the second DCI 725 may be based on the second portion of the UE identifier.

As indicated above, FIG. 7 is provided as an example. Other examples may differ from what is described with respect to FIG. 7.

Figure 8:
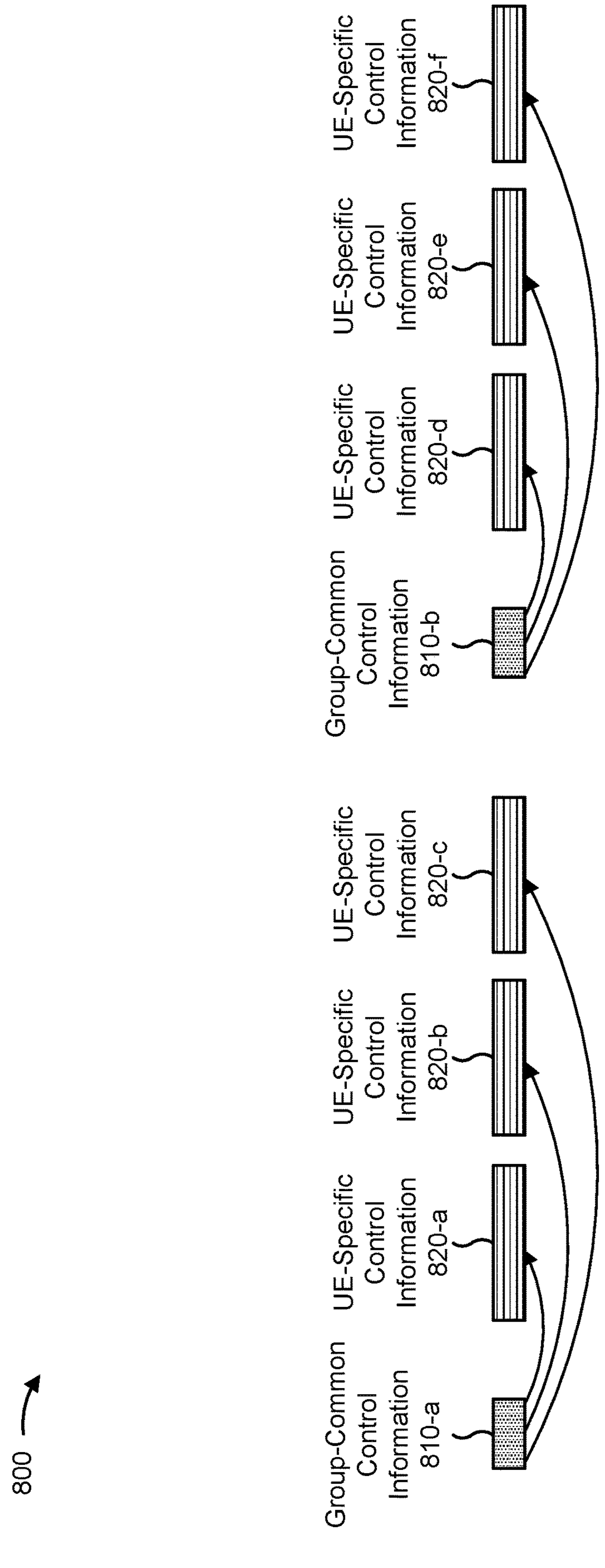

FIG. 8 is a diagram illustrating an example 800 of a control information configuration, in accordance with the present disclosure. In some cases, the example 800 illustrates example an example configuration of group-common control information 810 and UE-specific control information 820, which may be examples of the group-common control information and the UE-specific control information described with reference to FIGS. 4-7.

In the example 800, the group-common control information 810 may indicate a presence of multiple PDCCH candidates for a UE to receive UE-specific control information 820. For example, the group-common control information 810-*a* may indicate three PDCCH candidates for one UE to receive the UE-specific control information 820-*a*, 820-*b*, and 820-*c*. Additionally, or alternatively, the group-common control information 810-*b* may indicate three PDCCH candidates for the one UE to receive the UE-specific control information 820-*d*, 820-*e*, and 820-*f*.

In some cases, the multiple PDCCH candidates may be in multiple monitoring occasions of the second DCI (e.g., may span different time resources). Additionally, or alternatively, the resources (e.g., CCEs) associated with each PDCCH candidate may be the same within the different monitoring occasions that include the UE-specific control information 820. That is, the network node may not indicate the resources (e.g., the CCEs) on a per-monitoring occasion basis, as a single indication may apply to the multiple different monitoring occasions.

In one example, the group-common control information 810 may activate or deactivate each UE to monitor the multiple monitoring occasions for the UE-specific control information 820. That is, the group-common control information 810 may indicate a presence of the UE-specific control information 820 in the multiple subsequent monitoring occasions (e.g., that each include one or more PDCCH candidates carrying the UE-specific control information 820). Here, a UE may continue to monitor the monitoring occasions (e.g., according to the semi-persistent configuration indicated by the group-common control information 810) to receive the UE-specific control information 820 until a subsequent group-common control information 810 deactivates the UE from monitoring the multiple monitoring occasions. In this example, a UE may transmit hybrid automatic repeat request (HARQ) signaling (e.g., a HARQ acknowledgement (ACK) or a HARQ negative ACK (NACK)) to the network node in response to successfully decoding or failing to successfully decode the group-common control information 810. In some cases, the UE may transmit HARQ signaling in response to group-common control information 810 that includes an activation for the UE to monitor subsequent monitoring occasions, in response to group-common control information 810 that includes a deactivation to deactivate the UE from monitoring subsequent monitoring occasions, or both.

In another example, the group-common control information 810 may indicate for the UE to monitor a quantity (e.g., X) of subsequent monitoring occasions to receive UE-specific control information 820. For example, the group-common control information 810-*a* and the group-common control information 810-*b* may indicate for a UE to monitor three subsequent monitoring occasions (e.g., to attempt to receive the three transmissions of UE-specific control information 820-*a*, 820-*b*, and 820-*c*, to attempt to receive the three transmission of UE-specific control information 820-*d*, 820-*e*, and 820-*f*). In some cases, the network node may transmit RRC signaling to configure the quantity of subsequent monitoring occasions (e.g., X). Additionally, or alternatively, the group-common control information 810 may indicate the quantity of subsequent monitoring occasions (e.g., X). In some other cases, the UE may derive the quantity of subsequent monitoring occasions (e.g., X) based on a periodicity of the monitoring occasions associated with the group-common control information 810 and/or the UE-specific control information 820 (e.g., based on a quantity of monitoring occasions associated with the UE-specific control information 820 that occur between consecutive monitoring occasions associated with the group-common control information 810).

As indicated above, FIG. 8 is provided as an example. Other examples may differ from what is described with respect to FIG. 8.

Figure 9:
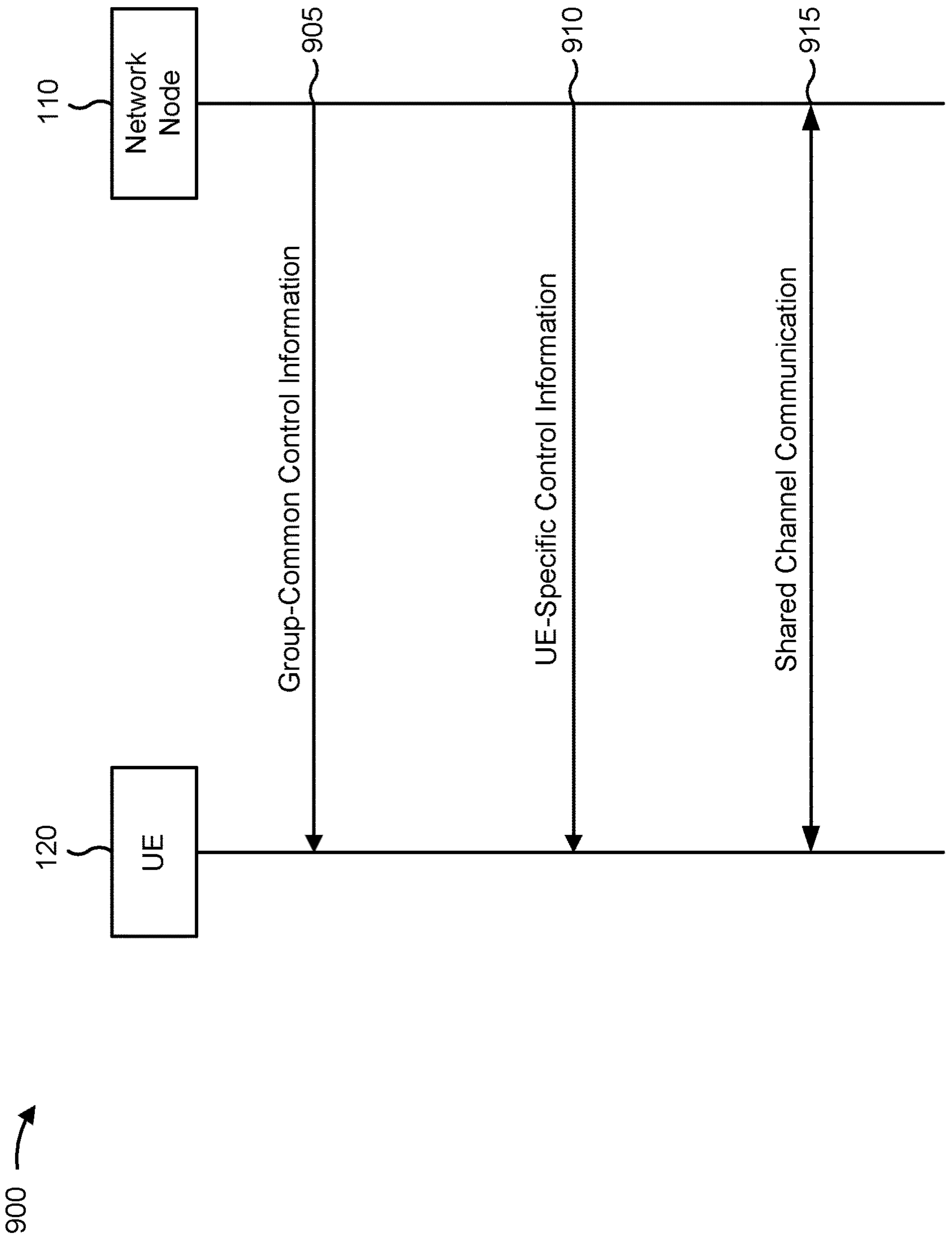
FIG. 9 is a diagram illustrating an example of a process, in accordance with the present disclosure.

FIG. 9 is a diagram illustrating an example 900 of a process, in accordance with the present disclosure. As shown in FIG. 9, a network node 110 and a UE 120 may communicate with one another.

As shown by reference number 905, the network node 110 may transmit, and the UE 120 may receive, group-common control information comprising an indication of one or more PDCCH candidates for receiving UE-specific control information for the UE 120. In some cases, while not illustrated, the network node 110 may transmit the group-common control information to a group of UEs (e.g., that are each associated with a same group RNTI), and the group-common control information may indicate, to each UE in the group, whether to monitor subsequent PDCCH candidates to receive control information that is specific to that UE.

As shown by reference number 910, the network node 110 may transmit, and the UE 120 may receive, the UE-specific control information in response to monitoring the one or more PDCCH candidates, the UE-specific control information comprising scheduling information for a shared channel communication.

As shown by reference number 915, the UE 120 may transmit or receive, and the network node 110 may receive or transmit, the shared channel communication according to the scheduling information.

As indicated above, FIG. 9 is provided as an example. Other examples may differ from what is described with respect to FIG. 9.

Figure 10:
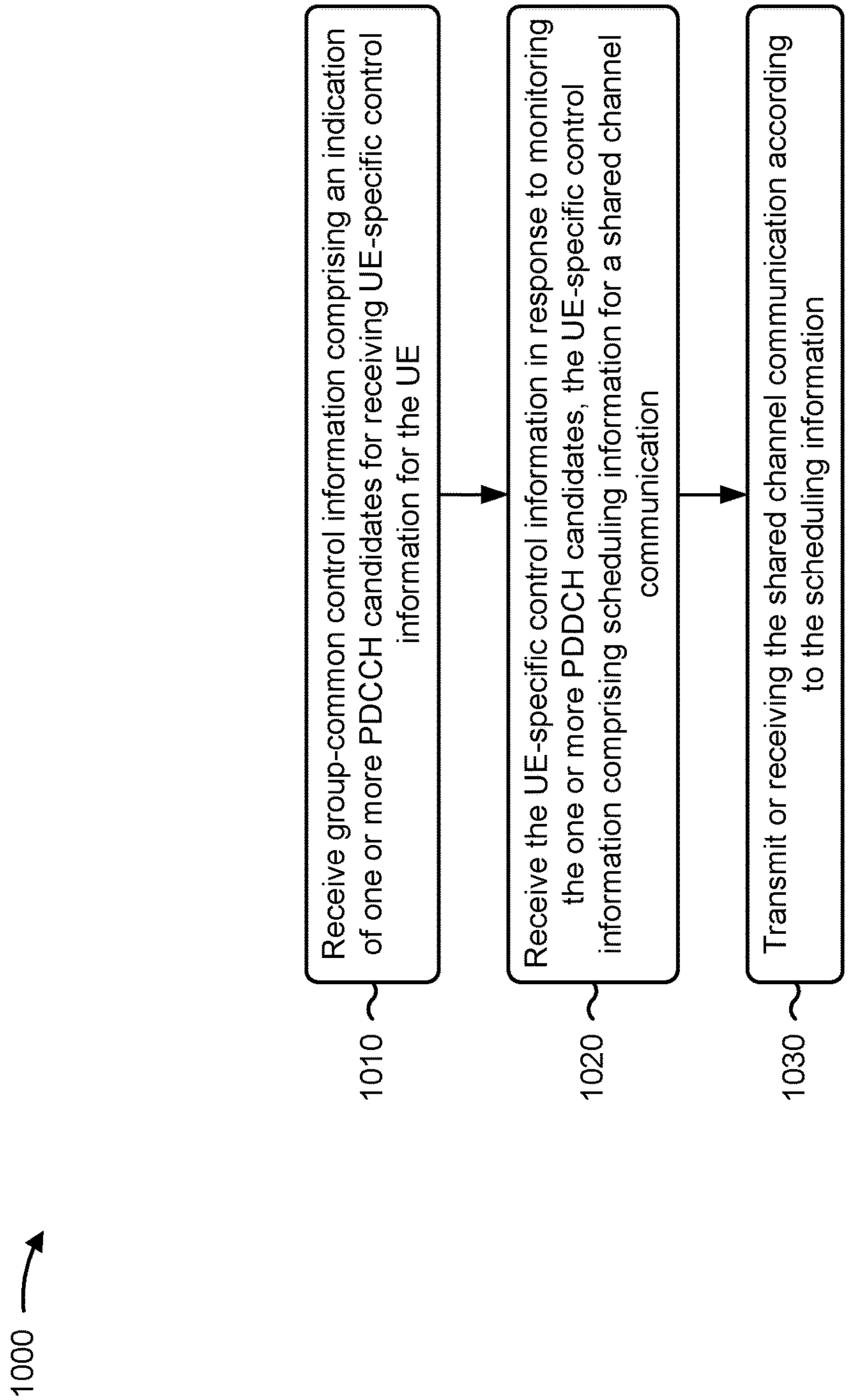
FIG. 10 is a diagram illustrating an example process performed, for example, at a UE or an apparatus of a UE, in accordance with the present disclosure.

FIG. 10 is a diagram illustrating an example process 1000 performed, for example, at a UE or an apparatus of a UE, in accordance with the present disclosure. Example process 1000 is an example where the apparatus or the UE (e.g., UE 120) performs operations associated with group-common control information for indicating UE-specific PDCCH candidates.

As shown in FIG. 10, in some aspects, process 1000 may include receiving group-common control information comprising an indication of one or more PDCCH candidates for receiving UE-specific control information for the UE (block 1010). For example, the UE (e.g., using reception component 1202 and/or communication manager 1206, depicted in FIG. 12) may receive group-common control information comprising an indication of one or more PDCCH candidates for receiving UE-specific control information for the UE, as described above.

As further shown in FIG. 10, in some aspects, process 1000 may include receiving the UE-specific control information in response to monitoring the one or more PDCCH candidates, the UE-specific control information comprising scheduling information for a shared channel communication (block 1020). For example, the UE (e.g., using reception component 1202 and/or communication manager 1206, depicted in FIG. 12) may receive the UE-specific control information in response to monitoring the one or more PDCCH candidates, the UE-specific control information comprising scheduling information for a shared channel communication, as described above.

As further shown in FIG. 10, in some aspects, process 1000 may include transmitting or receiving the shared channel communication according to the scheduling information (block 1030). For example, the UE (e.g., using transmission component 1204 and/or communication manager 1206, depicted in FIG. 12) may transmit or receive the shared channel communication according to the scheduling information, as described above.

Process 1000 may include additional aspects, such as any single aspect or any combination of aspects described below and/or in connection with one or more other processes described elsewhere herein.

In a first aspect, process 1000 includes determining whether to monitor subsequent PDCCH candidates for the UE-specific control information based at least in part on one or more bits in the group-common control information, wherein receiving the UE-specific control information is in response to the one or more bits in the group-common control information indicating that subsequent PDCCH candidates comprise the UE-specific control information for the UE.

In a second aspect, alone or in combination with the first aspect, process 1000 includes the group-common control information is associated with a set of UEs including at least the UE, the group-common control information corresponds to a bitmap indicating whether each UE, in the set of UEs, is to monitor any PDCCH candidates in a set of subsequent PDCCH candidates that each comprise control information that is UE-specific, and the indication of the one or more PDCCH candidates for receiving the UE-specific control information for the UE is based at least in part on a first bit in the bitmap that is associated with the UE.

In a third aspect, alone or in combination with one or more of the first and second aspects, process 1000 includes receiving RRC signaling indicating a quantity of bits in the bitmap, one or more bits in the bitmap associated with the UE, or both.

In a fourth aspect, alone or in combination with one or more of the first through third aspects, process 1000 includes identifying the one or more PDCCH candidates based at least in part on an aggregation level associated with the UE-specific control information, an initial resource associated with the set of subsequent PDCCH candidates, and a quantity of bits in the bitmap having a first value and having a position prior to the first bit in the bitmap, wherein each bit in the bitmap having the first value indicates that one UE, from the set of UEs, is to monitor at least one PDCCH candidate in the set of subsequent PDCCH candidates.

In a fifth aspect, alone or in combination with one or more of the first through fourth aspects, process 1000 includes receiving RRC signaling indicating the aggregation level and the initial resource, wherein the aggregation level is the same for each UE in the set of UEs that is to monitor any PDCCH candidates in the set of subsequent PDCCH candidates.

In a sixth aspect, alone or in combination with one or more of the first through fifth aspects, process 1000 includes the group-common control information indicates the aggregation level and the initial resource, and the aggregation level is the same for each UE in the set of UEs that is to monitor any PDCCH candidates in the set of subsequent PDCCH candidates.

In a seventh aspect, alone or in combination with one or more of the first through sixth aspects, process 1000 includes the group-common control information indicates a set of aggregation levels associated with the control information that is UE-specific, and each aggregation level of the set of aggregation levels is associated with one UE in the set of UEs that is to monitor any PDCCH candidates in the set of subsequent PDCCH candidates.

In an eighth aspect, alone or in combination with one or more of the first through seventh aspects, process 1000 includes identifying the one or more PDCCH candidates based at least in part on an initial resource associated with the set of subsequent PDCCH candidates, a quantity of resources associated with the set of subsequent PDCCH candidates, a first quantity of bits in the bitmap having a first value, and a second quantity of bits in the bitmap having the first value and having a position prior to the first bit in the bitmap, wherein each bit in the bitmap having the first value indicates that one UE, from the set of UEs, is to monitor at least one PDCCH candidate in the set of subsequent PDCCH candidates.

In a ninth aspect, alone or in combination with one or more of the first through eighth aspects, process 1000 includes receiving RRC signaling indicating the initial resource and the quantity of resources.

In a tenth aspect, alone or in combination with one or more of the first through ninth aspects, process 1000 includes the group-common control information indicates the initial resource and the quantity of resources.

In an eleventh aspect, alone or in combination with one or more of the first through tenth aspects, process 1000 includes identifying the bitmap based at least in part on a set of bits included in the group-common control information and a threshold quantity of UEs that can be configured to monitor any PDCCH candidates in the set of subsequent PDCCH candidates by the bitmap.

In a twelfth aspect, alone or in combination with one or more of the first through eleventh aspects, process 1000 includes receiving control information indicating a subset of fields in the group-common control information that are associated with the UE, and monitoring the subset of the fields in the group-common control information to receive the indication of the one or more PDCCH candidates.

In a thirteenth aspect, alone or in combination with one or more of the first through twelfth aspects, the subset of the fields comprises a first field indicating whether any PDCCH candidates in a set of subsequent PDCCH candidates comprise control information that is specific to the UE, a second field indicating an aggregation level associated with the UE-specific control information, or a third field indicating an initial resource associated with the one or more PDCCH candidates.

In a fourteenth aspect, alone or in combination with one or more of the first through thirteenth aspects, process 1000 includes identifying a subset of fields in the group-common control information that are associated with the UE based at least in part on the subset of the fields comprising an indication of a UE identity associated with the UE, wherein the subset of the fields comprise the indication of the one or more PDCCH candidates based at least in part on an association between the subset of the fields and the one or more PDCCH candidates.

In a fifteenth aspect, alone or in combination with one or more of the first through fourteenth aspects, the group-common control information and the UE-specific control information are associated with a same search space set, a same monitoring occasion, a same slot, and a same control resource set.

In a sixteenth aspect, alone or in combination with one or more of the first through fifteenth aspects, at least one of a first search space set, a first monitoring occasion, a first slot, or a first control resource set associated with the group-common control information is different from at least one of a second search space set, a second monitoring occasion, a second slot, or a second control resource set associated with the UE-specific control information.

In a seventeenth aspect, alone or in combination with one or more of the first through sixteenth aspects, process 1000 includes receiving RRC signaling indicating an association between a first DCI format of the group-common control information and a second DCI format of the UE-specific control information.

In an eighteenth aspect, alone or in combination with one or more of the first through seventeenth aspects, the group-common control information comprises an indication of a DCI format of the UE-specific control information.

In a nineteenth aspect, alone or in combination with one or more of the first through eighteenth aspects, process 1000 includes failing to decode a second group-common control information, and performing, in response to failing to decode the second group-common control information, one or more blind decoding operations on a set of subsequent PDCCH candidates that comprise control information that is UE-specific, to attempt to detect second UE-specific control information for the UE.

In a twentieth aspect, alone or in combination with one or more of the first through nineteenth aspects, process 1000 includes failing to decode a second group-common control information, and refraining from attempting to decode any PDCCH candidates in a set of subsequent PDCCH candidates that comprise control information that is UE-specific in response to failing to decode the second group-common control information.

In a twenty-first aspect, alone or in combination with one or more of the first through twentieth aspects, the group-common control information indicates a plurality of subsequent monitoring occasions comprising the UE-specific control information, and process 1000 includes monitoring the plurality of subsequent monitoring occasions, wherein receiving the UE-specific control information is in response to monitoring the plurality of subsequent monitoring occasions.

In a twenty-second aspect, alone or in combination with one or more of the first through twenty-first aspects, the indication of the one or more PDCCH candidates comprises an indication of a set of CCEs corresponding to the one or more PDCCH candidates, an aggregation level associated with the UE-specific control information, a control resource set associated with the one or more PDCCH candidates, a search space set associated with the one or more PDCCH candidates, a monitoring occasion associated with the one or more PDCCH candidates, a slot associated with the one or more PDCCH candidates, a DCI format associated with the UE-specific control information, or a payload size associated with the UE-specific control information.

In a twenty-third aspect, alone or in combination with one or more of the first through twenty-second aspects, process 1000 includes the group-common control information is associated with a group-common RNTI, and the UE-specific control information is associated with a C-RNTI.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
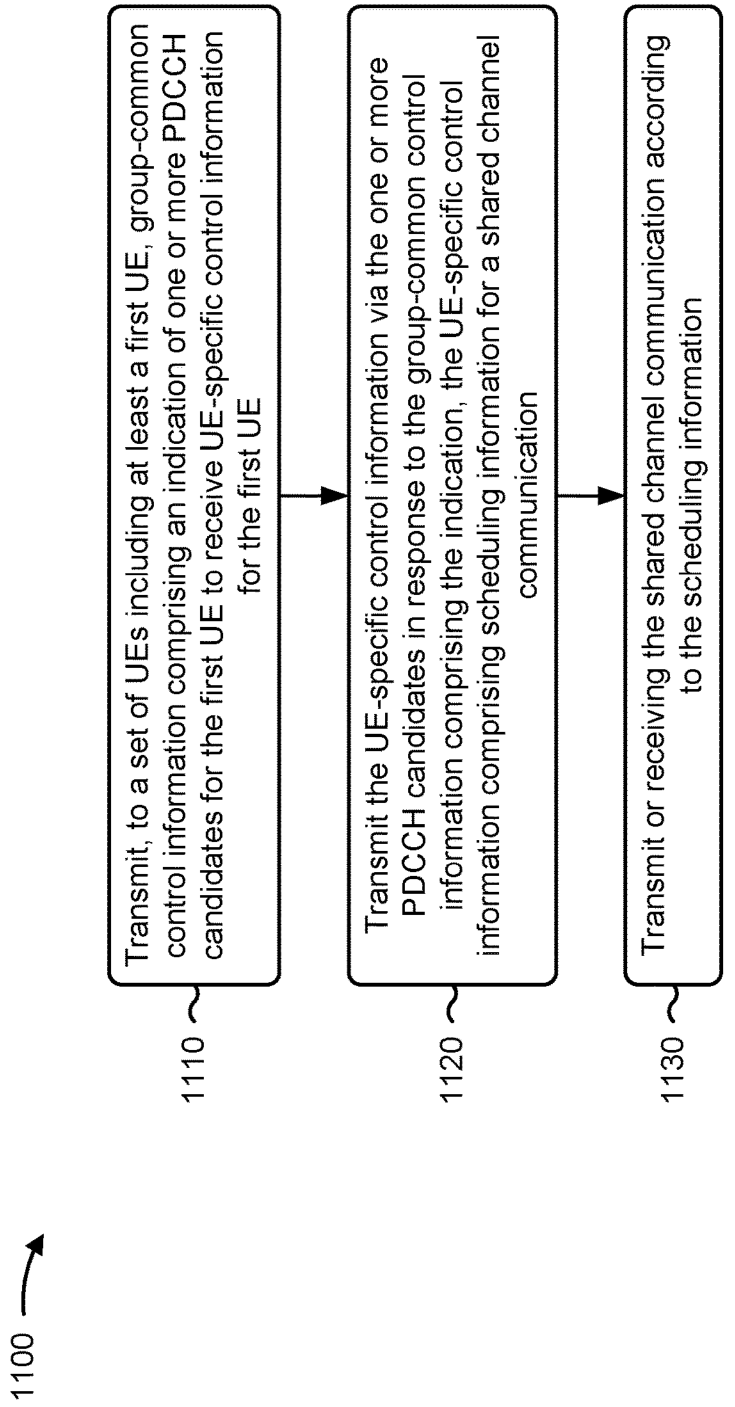
FIG. 11 is a diagram illustrating an example process performed, for example, at a network node or an apparatus of a network node, in accordance with the present disclosure.

FIG. 11 is a diagram illustrating an example process 1100 performed, for example, at a network node or an apparatus of a network node, in accordance with the present disclosure. Example process 1100 is an example where the apparatus or the network node (e.g., network node 110) performs operations associated with group-common control information for indicating UE-specific PDCCH candidates.

As shown in FIG. 11, in some aspects, process 1100 may include transmitting, to a set of UEs including at least a first UE, group-common control information comprising an indication of one or more PDCCH candidates for the first UE to receive UE-specific control information for the first UE (block 1110). For example, the network node (e.g., using transmission component 1304 and/or communication manager 1306, depicted in FIG. 13) may transmit, to a set of UEs including at least a first UE, group-common control information comprising an indication of one or more PDCCH candidates for the first UE to receive UE-specific control information for the first UE, as described above.

As further shown in FIG. 11, in some aspects, process 1100 may include transmitting the UE-specific control information via the one or more PDCCH candidates in response to the group-common control information comprising the indication, the UE-specific control information comprising scheduling information for a shared channel communication (block 1120). For example, the network node (e.g., using transmission component 1304 and/or communication manager 1306, depicted in FIG. 13) may transmit the UE-specific control information via the one or more PDCCH candidates in response to the group-common control information comprising the indication, the UE-specific control information comprising scheduling information for a shared channel communication, as described above.

As further shown in FIG. 11, in some aspects, process 1100 may include transmitting or receiving the shared channel communication according to the scheduling information (block 1130). For example, the network node (e.g., using transmission component 1304 and/or communication manager 1306, depicted in FIG. 13) may transmit or receive the shared channel communication according to the scheduling information, as described above.

Process 1100 may include additional aspects, such as any single aspect or any combination of aspects described below and/or in connection with one or more other processes described elsewhere herein.

In a first aspect, the group-common control information comprises one or more bits indicating that subsequent PDCCH candidates comprise the UE-specific control information for the first UE.

In a second aspect, alone or in combination with the first aspect, process 1100 includes the group-common control information corresponds to a bitmap indicating whether each UE, in the set of UEs, is to monitor any PDCCH candidates in a set of subsequent PDCCH candidates that each comprise control information that is UE-specific, and the indication of the one or more PDCCH candidates for the UE-specific control information for the first UE is based at least in part on a first bit in the bitmap that is associated with the first UE.

In a third aspect, alone or in combination with one or more of the first and second aspects, process 1100 includes transmitting RRC signaling indicating a quantity of bits in the bitmap, one or more bits in the bitmap associated with the first UE, or both.

In a fourth aspect, alone or in combination with one or more of the first through third aspects, process 1100 includes indicating the one or more PDCCH candidates based at least in part on an aggregation level associated with the UE-specific control information, an initial resource associated with the set of subsequent PDCCH candidates, and a quantity of bits in the bitmap having a first value and having a position prior to the first bit in the bitmap, wherein each bit in the bitmap having the first value indicates that one UE, from the set of UEs, is to monitor at least one PDCCH candidate in the set of subsequent PDCCH candidates.

In a fifth aspect, alone or in combination with one or more of the first through fourth aspects, process 1100 includes transmitting RRC signaling indicating the aggregation level and the initial resource, wherein the aggregation level is the same for each UE in the set of UEs that is to monitor any PDCCH candidates in the set of subsequent PDCCH candidates.

In a sixth aspect, alone or in combination with one or more of the first through fifth aspects, process 1100 includes the group-common control information indicates the aggregation level and the initial resource, and the aggregation level is the same for each UE in the set of UEs that is to monitor any PDCCH candidates in the set of subsequent PDCCH candidates.

In a seventh aspect, alone or in combination with one or more of the first through sixth aspects, process 1100 includes the group-common control information indicates a set of aggregation levels associated with the control information that is UE-specific, and each aggregation level of the set of aggregation levels is associated with one UE in the set of UEs.

In an eighth aspect, alone or in combination with one or more of the first through seventh aspects, process 1100 includes indicating the one or more PDCCH candidates based at least in part on an initial resource associated with the set of subsequent PDCCH candidates, a quantity of resources associated with the set of subsequent PDCCH candidates, a first quantity of bits in the bitmap having a first value, and a second quantity of bits in the bitmap having the first value and having a position prior to the first bit in the bitmap, wherein each bit in the bitmap having the first value indicates that one UE, from the set of UEs, is to monitor at least one PDCCH candidate in the set of subsequent PDCCH candidates.

In a ninth aspect, alone or in combination with one or more of the first through eighth aspects, process 1100 includes transmitting RRC signaling indicating the initial resource and the quantity of resources.

In a tenth aspect, alone or in combination with one or more of the first through ninth aspects, process 1100 includes the group-common control information indicates the initial resource and the quantity of resources.

In an eleventh aspect, alone or in combination with one or more of the first through tenth aspects, process 1100 includes indicating the bitmap based at least in part on a set of bits included in the group-common control information and a threshold quantity of UEs that can be configured to monitor any PDCCH candidates in the set of subsequent PDCCH candidates by the bitmap.

In a twelfth aspect, alone or in combination with one or more of the first through eleventh aspects, process 1100 includes transmitting control information indicating a subset of fields in the group-common control information that are associated with the first UE, wherein the indication of the one or more PDCCH candidates for the first UE to receive the UE-specific control information is in the subset of the fields.

In a thirteenth aspect, alone or in combination with one or more of the first through twelfth aspects, the subset of the fields comprises a first field indicating whether any PDCCH candidates in a set of subsequent PDCCH candidates comprise control information that is specific to the first UE, a second field indicating an aggregation level associated with the UE-specific control information, or a third field indicating an initial resource associated with the one or more PDCCH candidates.

In a fourteenth aspect, alone or in combination with one or more of the first through thirteenth aspects, process 1100 includes indicating a subset of fields in the group-common control information that are associated with the first UE based at least in part on the subset of the fields comprising an indication of a UE identify associated with the first UE, wherein the subset of the fields comprise the indication of the one or more PDCCH candidates based at least in part on an association between the subset of the fields and the one or more PDCCH candidates.

In a fifteenth aspect, alone or in combination with one or more of the first through fourteenth aspects, the group-common control information and the UE-specific control information are associated with a same search space set, a same monitoring occasion, a same slot, and a same control resource set.

In a sixteenth aspect, alone or in combination with one or more of the first through fifteenth aspects, at least one of a first search space set, a first monitoring occasion, a first slot, or a first control resource set associated with the group-common control information is different from at least one of a second search space set, a second monitoring occasion, a second slot, or a second control resource set associated with the UE-specific control information.

In a seventeenth aspect, alone or in combination with one or more of the first through sixteenth aspects, process 1100 includes transmitting RRC signaling indicating an association between a first DCI format of the group-common control information and a second DCI format of the UE-specific control information.

In an eighteenth aspect, alone or in combination with one or more of the first through seventeenth aspects, the group-common control information comprises an indication of a DCI format of the UE-specific control information.

In a nineteenth aspect, alone or in combination with one or more of the first through eighteenth aspects, the indication of the one or more PDCCH candidates comprises an indication of a set of CCEs corresponding to the one or more PDCCH candidates, an aggregation level associated with the UE-specific control information, a control resource set associated with the one or more PDCCH candidates, a search space set associated with the one or more PDCCH candidates, a monitoring occasion associated with the one or more PDCCH candidates, a slot associated with the one or more PDCCH candidates, a DCI format associated with the UE-specific control information, or a payload size associated with the UE-specific control information.

In a twentieth aspect, alone or in combination with one or more of the first through nineteenth aspects, process 1100 includes the group-common control information is associated with a group-common RNTI, and the UE-specific control information is associated with a C-RNTI.

In a twenty-first aspect, alone or in combination with one or more of the first through twentieth aspects, process 1100 includes transmitting control signaling to the set of UEs configuring a group of UEs comprising the set of UEs based at least in part on a channel condition associated with communications between the network node and each UE in the set of UEs, a beam direction associated with communications between the network node and each UE in the set of UEs, or a combination thereof, wherein transmitting the group-common control information is based at least in part on transmitting the control signaling to the set of UEs.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
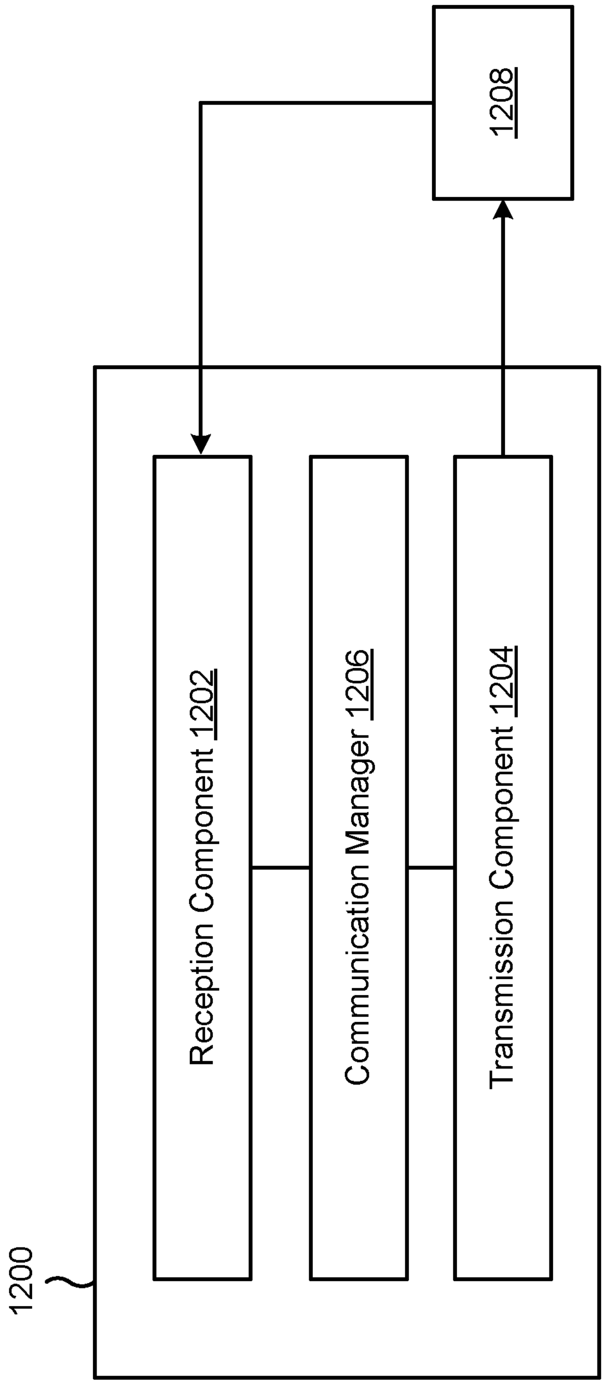
FIGS. 12 and 13 are diagrams of example apparatuses for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 4-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1204 may be co-located with the reception component 1202 in one or more transceivers.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive group-common control information comprising an indication of one or more PDCCH candidates for receiving UE-specific control information for the UE. The reception component 1202 may receive the UE-specific control information in response to monitoring the one or more PDCCH candidates, the UE-specific control information comprising scheduling information for a shared channel communication. The transmission component 1204 may transmit or receive the shared channel communication according to the scheduling information.

The communication manager 1206 may determine whether to monitor subsequent PDCCH candidates for the UE-specific control information based at least in part on one or more bits in the group-common control information, wherein receiving the UE-specific control information is in response to the one or more bits in the group-common control information indicating that subsequent PDCCH candidates comprise the UE-specific control information for the UE.

The reception component 1202 may receive RRC signaling indicating a quantity of bits in the bitmap, one or more bits in the bitmap associated with the UE, or both.

The communication manager 1206 may identify the one or more PDCCH candidates based at least in part on an aggregation level associated with the UE-specific control information, an initial resource associated with the set of subsequent PDCCH candidates, and a quantity of bits in the bitmap having a first value and having a position prior to the first bit in the bitmap wherein each bit in the bitmap having the first value indicates that one UE, from the set of UEs, is to monitor at least one PDCCH candidate in the set of subsequent PDCCH candidates.

The reception component 1202 may receive RRC signaling indicating the aggregation level and the initial resource wherein the aggregation level is the same for each UE in the set of UEs that is to monitor any PDCCH candidates in the set of subsequent PDCCH candidates.

The communication manager 1206 may identify the one or more PDCCH candidates based at least in part on an initial resource associated with the set of subsequent PDCCH candidates, a quantity of resources associated with the set of subsequent PDCCH candidates, a first quantity of bits in the bitmap having a first value, and a second quantity of bits in the bitmap having the first value and having a position prior to the first bit in the bitmap wherein each bit in the bitmap having the first value indicates that one UE, from the set of UEs, is to monitor at least one PDCCH candidate in the set of subsequent PDCCH candidates.

The reception component 1202 may receive RRC signaling indicating the initial resource and the quantity of resources.

The communication manager 1206 may identify the bitmap based at least in part on a set of bits included in the group-common control information and a threshold quantity of UEs that can be configured to monitor any PDCCH candidates in the set of subsequent PDCCH candidates by the bitmap.

The reception component 1202 may receive control information indicating a subset of fields in the group-common control information that are associated with the UE.

The communication manager 1206 may monitor the subset of the fields in the group-common control information to receive the indication of the one or more PDCCH candidates.

The communication manager 1206 may identify a subset of fields in the group-common control information that are associated with the UE based at least in part on the subset of the fields comprising an indication of a UE identity associated with the UE wherein the subset of the fields comprise the indication of the one or more PDCCH candidates based at least in part on an association between the subset of the fields and the one or more PDCCH candidates.

The reception component 1202 may receive RRC signaling indicating an association between a first DCI format of the group-common control information and a second DCI format of the UE-specific control information.

The communication manager 1206 may fail to decode a second group-common control information.

The communication manager 1206 may perform, in response to failing to decode the second group-common control information, one or more blind decoding operations on a set of subsequent PDCCH candidates that comprise control information that is UE-specific, to attempt to detect second UE-specific control information for the UE.

The communication manager 1206 may fail to decode a second group-common control information.

The communication manager 1206 may refrain from attempting to decode any PDCCH candidates in a set of subsequent PDCCH candidates that comprise control information that is UE-specific in response to failing to decode the second group-common control information.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
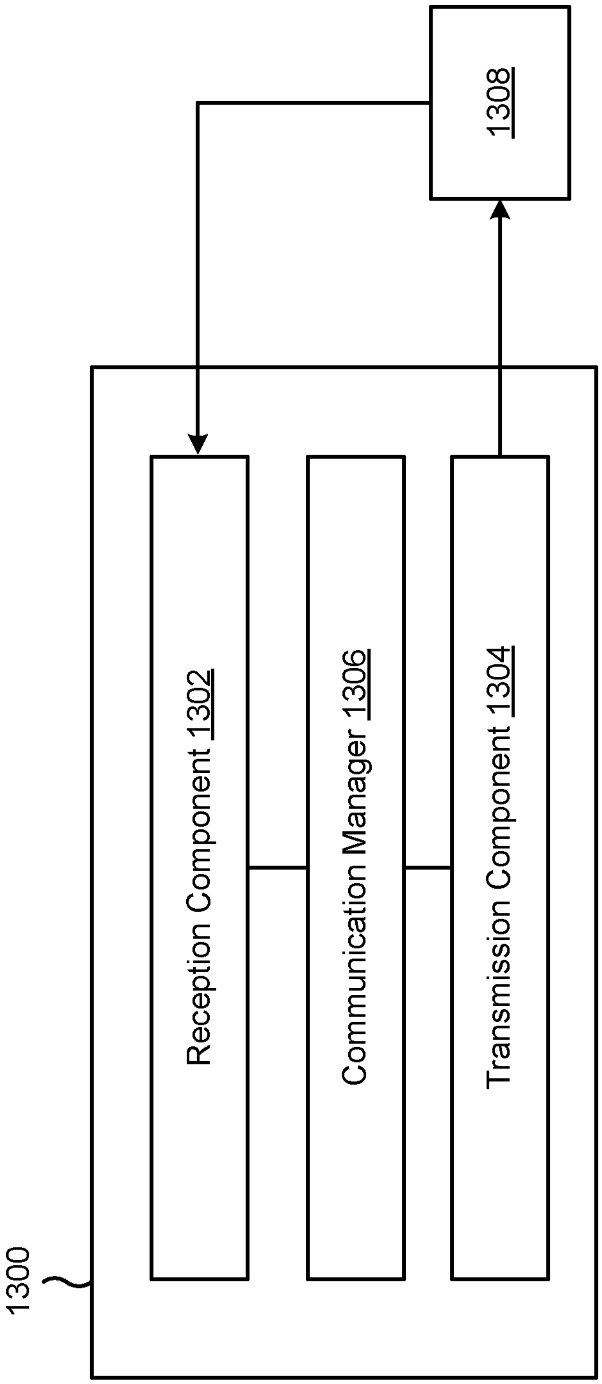

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 150 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 4-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1302 and/or the transmission component 1304 may include or may be included in a network interface. The network interface may be configured to obtain and/or output signals for the apparatus 1300 via one or more communications links, such as a backhaul link, a midhaul link, and/or a fronthaul link.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1304 may be co-located with the reception component 1302 in one or more transceivers.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The transmission component 1304 may transmit, to a set of UEs including at least a first UE, group-common control information comprising an indication of one or more PDCCH candidates for the first UE to receive UE-specific control information for the first UE. The transmission component 1304 may transmit the UE-specific control information via the one or more PDCCH candidates in response to the group-common control information comprising the indication, the UE-specific control information comprising scheduling information for a shared channel communication. The transmission component 1304 may transmit or receive the shared channel communication according to the scheduling information.

The transmission component 1304 may transmit RRC signaling indicating a quantity of bits in the bitmap, one or more bits in the bitmap associated with the first UE, or both.

The communication manager 1306 may indicate the one or more PDCCH candidates based at least in part on an aggregation level associated with the UE-specific control information, an initial resource associated with the set of subsequent PDCCH candidates, and a quantity of bits in the bitmap having a first value and having a position prior to the first bit in the bitmap wherein each bit in the bitmap having the first value indicates that one UE, from the set of UEs, is to monitor at least one PDCCH candidate in the set of subsequent PDCCH candidates.

The transmission component 1304 may transmit RRC signaling indicating the aggregation level and the initial resource wherein the aggregation level is the same for each UE in the set of UEs that is to monitor any PDCCH candidates in the set of subsequent PDCCH candidates.

The communication manager 1306 may indicate the one or more PDCCH candidates based at least in part on an initial resource associated with the set of subsequent PDCCH candidates, a quantity of resources associated with the set of subsequent PDCCH candidates, a first quantity of bits in the bitmap having a first value, and a second quantity of bits in the bitmap having the first value and having a position prior to the first bit in the bitmap wherein each bit in the bitmap having the first value indicates that one UE, from the set of UEs, is to monitor at least one PDCCH candidate in the set of subsequent PDCCH candidates.

The transmission component 1304 may transmit RRC signaling indicating the initial resource and the quantity of resources.

The communication manager 1306 may indicate the bitmap based at least in part on a set of bits included in the group-common control information and a threshold quantity of UEs that can be configured to monitor any PDCCH candidates in the set of subsequent PDCCH candidates by the bitmap.

The transmission component 1304 may transmit control information indicating a subset of fields in the group-common control information that are associated with the first UE, wherein the indication of the one or more PDCCH candidates for the first UE to receive the UE-specific control information is in the subset of the fields.

The communication manager 1306 may indicate a subset of fields in the group-common control information that are associated with the first UE based at least in part on the subset of the fields comprising an indication of a UE identify associated with the first UE wherein the subset of the fields comprise the indication of the one or more PDCCH candidates based at least in part on an association between the subset of the fields and the one or more PDCCH candidates.

The transmission component 1304 may transmit RRC signaling indicating an association between a first DCI format of the group-common control information and a second DCI format of the UE-specific control information.

The transmission component 1304 may transmit control signaling to the set of UEs configuring a group of UEs comprising the set of UEs based at least in part on a channel condition associated with communications between the network node and each UE in the set of UEs, a beam direction associated with communications between the network node and each UE in the set of UEs, or a combination thereof wherein transmitting the group-common control information is based at least in part on transmitting the control signaling to the set of UEs.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a UE, comprising: receiving group-common control information comprising an indication of one or more PDCCH candidates for receiving UE-specific control information for the UE; receiving the UE-specific control information in response to monitoring the one or more PDCCH candidates, the UE-specific control information comprising scheduling information for a shared channel communication; and transmitting or receiving the shared channel communication according to the scheduling information.

Aspect 2: The method of Aspect 1, further comprising: determining whether to monitor subsequent PDCCH candidates for the UE-specific control information based at least in part on one or more bits in the group-common control information, wherein receiving the UE-specific control information is in response to the one or more bits in the group-common control information indicating that subsequent PDCCH candidates comprise the UE-specific control information for the UE.

Aspect 3: The method of any of Aspects 1-2, wherein: the group-common control information is associated with a set of UEs including at least the UE; the group-common control information corresponds to a bitmap indicating whether each UE, in the set of UEs, is to monitor any PDCCH candidates in a set of subsequent PDCCH candidates that each comprise control information that is UE-specific; and the indication of the one or more PDCCH candidates for receiving the UE-specific control information for the UE is based at least in part on a first bit in the bitmap that is associated with the UE.

Aspect 4: The method of Aspect 3, further comprising: receiving RRC signaling indicating a quantity of bits in the bitmap, one or more bits in the bitmap associated with the UE, or both.

Aspect 5: The method of Aspect 3, further comprising: identifying the one or more PDCCH candidates based at least in part on an aggregation level associated with the UE-specific control information, an initial resource associated with the set of subsequent PDCCH candidates, and a quantity of bits in the bitmap having a first value and having a position prior to the first bit in the bitmap, wherein each bit in the bitmap having the first value indicates that one UE, from the set of UEs, is to monitor at least one PDCCH candidate in the set of subsequent PDCCH candidates.

Aspect 6: The method of Aspect 5, further comprising: receiving RRC signaling indicating the aggregation level and the initial resource, wherein the aggregation level is the same for each UE in the set of UEs that is to monitor any PDCCH candidates in the set of subsequent PDCCH candidates.

Aspect 7: The method of Aspect 5, wherein: the group-common control information indicates the aggregation level and the initial resource; and the aggregation level is the same for each UE in the set of UEs that is to monitor any PDCCH candidates in the set of subsequent PDCCH candidates.

Aspect 8: The method of Aspect 5, wherein: the group-common control information indicates a set of aggregation levels associated with the control information that is UE-specific; and each aggregation level of the set of aggregation levels is associated with one UE in the set of UEs that is to monitor any PDCCH candidates in the set of subsequent PDCCH candidates.

Aspect 9: The method of Aspect 3, further comprising: identifying the one or more PDCCH candidates based at least in part on an initial resource associated with the set of subsequent PDCCH candidates, a quantity of resources associated with the set of subsequent PDCCH candidates, a first quantity of bits in the bitmap having a first value, and a second quantity of bits in the bitmap having the first value and having a position prior to the first bit in the bitmap, wherein each bit in the bitmap having the first value indicates that one UE, from the set of UEs, is to monitor at least one PDCCH candidate in the set of subsequent PDCCH candidates.

Aspect 10: The method of Aspect 9, further comprising: receiving RRC signaling indicating the initial resource and the quantity of resources.

Aspect 11: The method of Aspect 9, wherein: the group-common control information indicates the initial resource and the quantity of resources.

Aspect 12: The method of Aspect 3, further comprising: identifying the bitmap based at least in part on a set of bits included in the group-common control information and a threshold quantity of UEs that can be configured to monitor any PDCCH candidates in the set of subsequent PDCCH candidates by the bitmap.

Aspect 13: The method of any of Aspects 1-12, further comprising: receiving control information indicating a subset of fields in the group-common control information that are associated with the UE; and monitoring the subset of the fields in the group-common control information to receive the indication of the one or more PDCCH candidates.

Aspect 14: The method of Aspect 13, wherein the subset of the fields comprises: a first field indicating whether any PDCCH candidates in a set of subsequent PDCCH candidates comprise control information that is specific to the UE; a second field indicating an aggregation level associated with the UE-specific control information; or a third field indicating an initial resource associated with the one or more PDCCH candidates.

Aspect 15: The method of any of Aspects 1-14, further comprising: identifying a subset of fields in the group-common control information that are associated with the UE based at least in part on the subset of the fields comprising an indication of a UE identity associated with the UE, wherein the subset of the fields comprise the indication of the one or more PDCCH candidates based at least in part on an association between the subset of the fields and the one or more PDCCH candidates.

Aspect 16: The method of any of Aspects 1-15, wherein the group-common control information and the UE-specific control information are associated with a same search space set, a same monitoring occasion, a same slot, and a same control resource set.

Aspect 17: The method of any of Aspects 1-16, wherein at least one of a first search space set, a first monitoring occasion, a first slot, or a first control resource set associated with the group-common control information is different from at least one of a second search space set, a second monitoring occasion, a second slot, or a second control resource set associated with the UE-specific control information.

Aspect 18: The method of any of Aspects 1-17, further comprising: receiving RRC signaling indicating an association between a first DCI format of the group-common control information and a second DCI format of the UE-specific control information.

Aspect 19: The method of any of Aspects 1-18, wherein the group-common control information comprises an indication of a DCI format of the UE-specific control information.

Aspect 20: The method of any of Aspects 1-19, further comprising: failing to decode a second group-common control information; and performing, in response to failing to decode the second group-common control information, one or more blind decoding operations on a set of subsequent PDCCH candidates that comprise control information that is UE-specific, to attempt to detect second UE-specific control information for the UE.

Aspect 21: The method of any of Aspects 1-20, further comprising: failing to decode a second group-common control information; and refraining from attempting to decode any PDCCH candidates in a set of subsequent PDCCH candidates that comprise control information that is UE-specific in response to failing to decode the second group-common control information.

Aspect 22: The method of any of Aspects 1-21, wherein the group-common control information indicates a plurality of subsequent monitoring occasions comprising the UE-specific control information, the method further comprising: monitoring the plurality of subsequent monitoring occasions, wherein receiving the UE-specific control information is in response to monitoring the plurality of subsequent monitoring occasions.

Aspect 23: The method of any of Aspects 1-22, wherein the indication of the one or more PDCCH candidates comprises an indication of a set of CCEs corresponding to the one or more PDCCH candidates, an aggregation level associated with the UE-specific control information, a control resource set associated with the one or more PDCCH candidates, a search space set associated with the one or more PDCCH candidates, a monitoring occasion associated with the one or more PDCCH candidates, a slot associated with the one or more PDCCH candidates, a DCI format associated with the UE-specific control information, or a payload size associated with the UE-specific control information.

Aspect 24: The method of any of Aspects 1-23, wherein: the group-common control information is associated with a group-common RNTI; and the UE-specific control information is associated with a C-RNTI.

Aspect 25: A method of wireless communication performed by a network node, comprising: transmitting, to a set of UEs including at least a first UE, group-common control information comprising an indication of one or more PDCCH candidates for the first UE to receive UE-specific control information for the first UE; transmitting the UE-specific control information via the one or more PDCCH candidates in response to the group-common control information comprising the indication, the UE-specific control information comprising scheduling information for a shared channel communication; and transmitting or receiving the shared channel communication according to the scheduling information.

Aspect 26: The method of Aspect 25, wherein the group-common control information comprises one or more bits indicating that subsequent PDCCH candidates comprise the UE-specific control information for the first UE.

Aspect 27: The method of any of Aspects 25-26, wherein: the group-common control information corresponds to a bitmap indicating whether each UE, in the set of UEs, is to monitor any PDCCH candidates in a set of subsequent PDCCH candidates that each comprise control information that is UE-specific; and the indication of the one or more PDCCH candidates for the UE-specific control information for the first UE is based at least in part on a first bit in the bitmap that is associated with the first UE.

Aspect 28: The method of Aspect 27, further comprising: transmitting RRC signaling indicating a quantity of bits in the bitmap, one or more bits in the bitmap associated with the first UE, or both.

Aspect 29: The method of Aspect 27, further comprising: indicating the one or more PDCCH candidates based at least in part on an aggregation level associated with the UE-specific control information, an initial resource associated with the set of subsequent PDCCH candidates, and a quantity of bits in the bitmap having a first value and having a position prior to the first bit in the bitmap, wherein each bit in the bitmap having the first value indicates that one UE, from the set of UEs, is to monitor at least one PDCCH candidate in the set of subsequent PDCCH candidates.

Aspect 30: The method of Aspect 29, further comprising: transmitting RRC signaling indicating the aggregation level and the initial resource, wherein the aggregation level is the same for each UE in the set of UEs that is to monitor any PDCCH candidates in the set of subsequent PDCCH candidates.

Aspect 31: The method of Aspect 29, wherein: the group-common control information indicates the aggregation level and the initial resource; and the aggregation level is the same for each UE in the set of UEs that is to monitor any PDCCH candidates in the set of subsequent PDCCH candidates.

Aspect 32: The method of Aspect 29, wherein: the group-common control information indicates a set of aggregation levels associated with the control information that is UE-specific; and each aggregation level of the set of aggregation levels is associated with one UE in the set of UEs.

Aspect 33: The method of Aspect 27, further comprising: indicating the one or more PDCCH candidates based at least in part on an initial resource associated with the set of subsequent PDCCH candidates, a quantity of resources associated with the set of subsequent PDCCH candidates, a first quantity of bits in the bitmap having a first value, and a second quantity of bits in the bitmap having the first value and having a position prior to the first bit in the bitmap, wherein each bit in the bitmap having the first value indicates that one UE, from the set of UEs, is to monitor at least one PDCCH candidate in the set of subsequent PDCCH candidates.

Aspect 34: The method of Aspect 33, further comprising: transmitting RRC signaling indicating the initial resource and the quantity of resources.

Aspect 35: The method of Aspect 33, wherein: the group-common control information indicates the initial resource and the quantity of resources.

Aspect 36: The method of Aspect 27, further comprising: indicating the bitmap based at least in part on a set of bits included in the group-common control information and a threshold quantity of UEs that can be configured to monitor any PDCCH candidates in the set of subsequent PDCCH candidates by the bitmap.

Aspect 37: The method of any of Aspects 25-36, further comprising: transmitting control information indicating a subset of fields in the group-common control information that are associated with the first UE, wherein the indication of the one or more PDCCH candidates for the first UE to receive the UE-specific control information is in the subset of the fields.

Aspect 38: The method of Aspect 37, wherein the subset of the fields comprises: a first field indicating whether any PDCCH candidates in a set of subsequent PDCCH candidates comprise control information that is specific to the first UE; a second field indicating an aggregation level associated with the UE-specific control information; or a third field indicating an initial resource associated with the one or more PDCCH candidates.

Aspect 39: The method of any of Aspects 25-38, further comprising: indicating a subset of fields in the group-common control information that are associated with the first UE based at least in part on the subset of the fields comprising an indication of a UE identify associated with the first UE, wherein the subset of the fields comprise the indication of the one or more PDCCH candidates based at least in part on an association between the subset of the fields and the one or more PDCCH candidates.

Aspect 40: The method of any of Aspects 25-39, wherein the group-common control information and the UE-specific control information are associated with a same search space set, a same monitoring occasion, a same slot, and a same control resource set.

Aspect 41: The method of any of Aspects 25-40, wherein at least one of a first search space set, a first monitoring occasion, a first slot, or a first control resource set associated with the group-common control information is different from at least one of a second search space set, a second monitoring occasion, a second slot, or a second control resource set associated with the UE-specific control information.

Aspect 42: The method of any of Aspects 25-41, further comprising: transmitting RRC signaling indicating an association between a first DCI format of the group-common control information and a second DCI format of the UE-specific control information.

Aspect 43: The method of any of Aspects 25-42, wherein the group-common control information comprises an indication of a DCI format of the UE-specific control information.

Aspect 44: The method of any of Aspects 25-43, wherein the indication of the one or more PDCCH candidates comprises an indication of a set of CCEs corresponding to the one or more PDCCH candidates, an aggregation level associated with the UE-specific control information, a control resource set associated with the one or more PDCCH candidates, a search space set associated with the one or more PDCCH candidates, a monitoring occasion associated with the one or more PDCCH candidates, a slot associated with the one or more PDCCH candidates, a DCI format associated with the UE-specific control information, or a payload size associated with the UE-specific control information.

Aspect 45: The method of any of Aspects 25-44, wherein: the group-common control information is associated with a group-common RNTI; and the UE-specific control information is associated with a C-RNTI.

Aspect 46: The method of any of Aspects 25-45, further comprising: transmitting control signaling to the set of UEs configuring a group of UEs comprising the set of UEs based at least in part on a channel condition associated with communications between the network node and each UE in the set of UEs, a beam direction associated with communications between the network node and each UE in the set of UEs, or a combination thereof, wherein transmitting the group-common control information is based at least in part on transmitting the control signaling to the set of UEs.

Aspect 47: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-46.

Aspect 48: An apparatus for wireless communication at a device, the apparatus comprising one or more memories and one or more processors coupled to the one or more memories, the one or more processors configured to cause the device to perform the method of one or more of Aspects 1-46.

Aspect 49: An apparatus for wireless communication, the apparatus comprising at least one means for performing the method of one or more of Aspects 1-46.

Aspect 50: A non-transitory computer-readable medium storing code for wireless communication, the code comprising instructions executable by one or more processors to perform the method of one or more of Aspects 1-46.

Aspect 51: A non-transitory computer-readable medium storing a set of instructions for wireless communication, the set of instructions comprising one or more instructions that, when executed by one or more processors of a device, cause the device to perform the method of one or more of Aspects 1-46.

Aspect 52: A device for wireless communication, the device comprising a processing system that includes one or more processors and one or more memories coupled with the one or more processors, the processing system configured to cause the device to perform the method of one or more of Aspects 1-46.

Aspect 53: An apparatus for wireless communication at a device, the apparatus comprising one or more memories and one or more processors coupled to the one or more memories, the one or more processors individually or collectively configured to cause the device to perform the method of one or more of Aspects 1-46.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a user equipment (UE), comprising:
- one or more memories; and
- one or more processors, coupled to the one or more memories, configured to cause the UE to:
  - receive group-common control information comprising an indication of one or more physical downlink control channel (PDCCH) candidates for receiving UE-specific control information for the UE;
  - receive the UE-specific control information in response to monitoring the one or more PDCCH candidates, the UE-specific control information comprising scheduling information for a shared channel communication; and
  - transmit or receive the shared channel communication according to the scheduling information.

2. The apparatus of claim 1, wherein the one or more processors are further configured to cause the UE to:
- determine whether to monitor subsequent PDCCH candidates for the UE-specific control information based at least in part on one or more bits in the group-common control information, wherein receiving the UE-specific control information is in response to the one or more bits in the group-common control information indicating that subsequent PDCCH candidates comprise the UE-specific control information for the UE.

3. The apparatus of claim 1, wherein:
- the group-common control information is associated with a set of UEs including at least the UE;
- the group-common control information corresponds to a bitmap indicating whether each UE, in the set of UEs, is to monitor any PDCCH candidates in a set of subsequent PDCCH candidates that each comprise control information that is UE-specific; and
- the indication of the one or more PDCCH candidates for receiving the UE-specific control information for the UE is based at least in part on a first bit in the bitmap that is associated with the UE.

4. The apparatus of claim 3, wherein the one or more processors are further configured to cause the UE to:
- receive radio resource control (RRC) signaling indicating a quantity of bits in the bitmap, one or more bits in the bitmap associated with the UE, or both.

5. The apparatus of claim 3, wherein the one or more processors are further configured to cause the UE to:
- identify the one or more PDCCH candidates based at least in part on an aggregation level associated with the UE-specific control information, an initial resource associated with the set of subsequent PDCCH candidates, and a quantity of bits in the bitmap having a first value and having a position prior to the first bit in the bitmap, wherein each bit in the bitmap having the first value indicates that one UE, from the set of UEs, is to monitor at least one PDCCH candidate in the set of subsequent PDCCH candidates.

6. The apparatus of claim 5, wherein the one or more processors are further configured to cause the UE to:

receive radio resource control (RRC) signaling indicating the aggregation level and the initial resource, wherein the aggregation level is the same for each UE in the set of UEs that is to monitor any PDCCH candidates in the set of subsequent PDCCH candidates.

7. The apparatus of claim 5, wherein:

the group-common control information indicates the aggregation level and the initial resource; and the aggregation level is the same for each UE in the set of UEs that is to monitor any PDCCH candidates in the set of subsequent PDCCH candidates.

8. The apparatus of claim 5, wherein:

the group-common control information indicates a set of aggregation levels associated with the control information that is UE-specific; and each aggregation level of the set of aggregation levels is associated with one UE in the set of UEs that is to monitor any PDCCH candidates in the set of subsequent PDCCH candidates.

9. The apparatus of claim 3, wherein the one or more processors are further configured to cause the UE to:

identify the one or more PDCCH candidates based at least in part on an initial resource associated with the set of subsequent PDCCH candidates, a quantity of resources associated with the set of subsequent PDCCH candidates, a first quantity of bits in the bitmap having a first value, and a second quantity of bits in the bitmap having the first value and having a position prior to the first bit in the bitmap, wherein each bit in the bitmap having the first value indicates that one UE, from the set of UEs, is to monitor at least one PDCCH candidate in the set of subsequent PDCCH candidates.

10. The apparatus of claim 3, wherein the one or more processors are further configured to cause the UE to:

identify the bitmap based at least in part on a set of bits included in the group-common control information and a threshold quantity of UEs that can be configured to monitor any PDCCH candidates in the set of subsequent PDCCH candidates by the bitmap.

11. The apparatus of claim 1, wherein the one or more processors are further configured to cause the UE to:

receive control information indicating a subset of fields in the group-common control information that are associated with the UE; and monitor the subset of the fields in the group-common control information to receive the indication of the one or more PDCCH candidates.

12. The apparatus of claim 1, wherein the one or more processors are further configured to cause the UE to:

identify a subset of fields in the group-common control information that are associated with the UE based at least in part on the subset of the fields comprising an indication of a UE identity associated with the UE, wherein the subset of the fields comprise the indication of the one or more PDCCH candidates based at least in part on an association between the subset of the fields and the one or more PDCCH candidates.

13. The apparatus of claim 1, wherein the one or more processors are further configured to cause the UE to:

receive radio resource control (RRC) signaling indicating an association between a first downlink control information (DCI) format of the group-common control information and a second DCI format of the UE-specific control information.

14. The apparatus of claim 1, wherein the group-common control information comprises an indication of a downlink control information (DCI) format of the UE-specific control information.

15. The apparatus of claim 1, wherein the one or more processors are further configured to cause the UE to:

fail to decode a second group-common control information; and perform, in response to failing to decode the second group-common control information, one or more blind decoding operations on a set of subsequent PDCCH candidates that comprise control information that is UE-specific, to attempt to detect second UE-specific control information for the UE.

16. The apparatus of claim 1, wherein the one or more processors are further configured to cause the UE to:

fail to decode a second group-common control information; and refrain from attempting to decode any PDCCH candidates in a set of subsequent PDCCH candidates that comprise control information that is UE-specific in response to failing to decode the second group-common control information.

17. The apparatus of claim 1, wherein:

the group-common control information indicates a plurality of subsequent monitoring occasions comprising the UE-specific control information;

the one or more processors are further configured to cause the UE to monitor the plurality of subsequent monitoring occasions; and receiving the UE-specific control information is in response to monitoring the plurality of subsequent monitoring occasions.

18. The apparatus of claim 1, wherein:

the group-common control information is associated with a group-common radio network temporary identifier (RNTI); and the UE-specific control information is associated with a cell RNTI (C-RNTI).

19. A method of wireless communication performed by a user equipment (UE), comprising:

receiving group-common control information comprising an indication of one or more physical downlink control channel (PDCCH) candidates for receiving UE-specific control information for the UE;

receiving the UE-specific control information in response to monitoring the one or more PDCCH candidates, the UE-specific control information comprising scheduling information for a shared channel communication; and transmitting or receiving the shared channel communication according to the scheduling information.

20. A non-transitory computer-readable medium storing a set of instructions for wireless communication, the set of instructions comprising:

one or more instructions that, when executed by one or more processors of a user equipment (UE), cause the UE to:

receive group-common control information comprising an indication of one or more physical downlink control channel (PDCCH) candidates for receiving UE-specific control information for the UE;

receive the UE-specific control information in response to monitoring the one or more PDCCH candidates, the UE-specific control information comprising scheduling information for a shared channel communication; and transmit or receive the shared channel communication according to the scheduling information.

* * * * *